(12) United States Patent
McGill et al.

(10) Patent No.: US 10,108,322 B2
(45) Date of Patent: Oct. 23, 2018

(54) DYNAMIC VIDEO EFFECTS FOR INTERACTIVE VIDEOS

(71) Applicant: Kaltura, Inc., New York, NY (US)

(72) Inventors: Brannan Patrick McGill, Portland, OR (US); Nathan Hepper, Boulder, CO (US); Caleb Hanson, Louisville, CO (US); Jonathan R. A. Woodard, Boulder, CO (US); Cameron Joel McCaddon, Boulder, CO (US)

(73) Assignee: KALTURA, INC., New York, NY (US)

( * ) Notice: Subject to any disclaimer, the term of this patent is extended or adjusted under 35 U.S.C. 154(b) by 302 days.

(21) Appl. No.: 14/983,115

(22) Filed: Dec. 29, 2015

(65) Prior Publication Data
US 2016/0196044 A1    Jul. 7, 2016

Related U.S. Application Data

(60) Provisional application No. 62/156,724, filed on May 4, 2015, provisional application No. 62/099,393, filed on Jan. 2, 2015.

(51) Int. Cl.
| | |
|---|---|
| *G06F 3/048* | (2013.01) |
| *G06F 3/0484* | (2013.01) |
| *G06F 3/0481* | (2013.01) |
| *G11B 27/031* | (2006.01) |
| *G06F 3/0482* | (2013.01) |
| *H04N 5/262* | (2006.01) |
| *G11B 27/10* | (2006.01) |
| *G06F 3/0485* | (2013.01) |

(52) U.S. Cl.
CPC ........ *G06F 3/04842* (2013.01); *G06F 3/0482* (2013.01); *G06F 3/0485* (2013.01); *G06F 3/04815* (2013.01); *G06F 3/04847* (2013.01); *G06F 3/04855* (2013.01); *G11B 27/031* (2013.01); *G11B 27/105* (2013.01); *H04N 5/262* (2013.01)

(58) Field of Classification Search
CPC .......................... G06F 3/04815; G06F 3/0482
USPC ....................................................... 715/720
See application file for complete search history.

(56) References Cited

U.S. PATENT DOCUMENTS

| | | | | |
|---|---|---|---|---|
| 5,888,172 A | * | 3/1999 | Andrus | A61B 5/6887 434/247 |
| 6,121,969 A | * | 9/2000 | Jain | G06F 3/04815 382/305 |
| 9,619,104 B2 | * | 4/2017 | Xin | G06F 3/04815 |

(Continued)

*Primary Examiner* — William Titcomb
(74) *Attorney, Agent, or Firm* — Dorsey & Whitney LLP

(57) ABSTRACT

Disclosed are systems and methods for displaying an interactive video. Displaying an interactive video may include at least rendering and playing a base video having at least one selector for an outcome video, receiving input selecting at least one selector, and transitioning to the outcome video while playing both the base video and the outcome video on particular portions of a display area. Displaying an interactive video may also include displaying a selector object associated with an interactive video, receiving user input indicating a user interaction with at least one surface of the selector object and rendering and playing a video segment responsive to the user interaction with the at least one surface of the selector object.

19 Claims, 22 Drawing Sheets
(16 of 22 Drawing Sheet(s) Filed in Color)

(56) References Cited

U.S. PATENT DOCUMENTS

| | | | | |
|---|---|---|---|---|
| 2002/0054158 A1* | 5/2002 | Asami | ............... | G06F 3/04815 715/838 |
| 2004/0075677 A1* | 4/2004 | Loyall | .................... | G06F 3/011 715/706 |
| 2005/0113162 A1* | 5/2005 | Olive | ................ | G07F 17/3244 463/16 |
| 2005/0130737 A1* | 6/2005 | Englman | ............... | G07F 17/32 463/25 |
| 2005/0215311 A1* | 9/2005 | Hornik | .................. | G07F 17/32 463/20 |
| 2006/0094490 A1* | 5/2006 | Reeves | ................. | G07F 17/32 463/16 |
| 2008/0246759 A1* | 10/2008 | Summers | ............. | G06F 3/0304 345/420 |
| 2009/0222768 A1* | 9/2009 | Roe | .................... | G06F 3/04815 715/850 |
| 2009/0259937 A1* | 10/2009 | Rohall | ............... | G06F 3/04815 715/706 |
| 2011/0292244 A1* | 12/2011 | Deever | ................ | G11B 27/10 348/231.2 |
| 2013/0322634 A1* | 12/2013 | Bennett | ................. | G10L 21/00 381/17 |
| 2014/0094280 A1* | 4/2014 | Berman | ............... | G07F 17/326 463/25 |
| 2014/0143687 A1* | 5/2014 | Tan | ..................... | G06F 3/1462 715/757 |
| 2016/0055718 A1* | 2/2016 | Lyons | ............... | G07F 17/3258 463/27 |
| 2017/0072321 A1* | 3/2017 | Thompson | ....... | H04N 21/23424 |
| 2017/0348599 A1* | 12/2017 | McNeil | ................ | A63F 13/497 |

\* cited by examiner

```
// Setup the Example video and api
<script src="flixtest/system/scripts/api.v2.min.js" type="text/javascript"></script>
<iframe name='videoframe' class='playerframe' src='http://-----------.com/
projects/l9X5oaJq/embed?autoplay=false&controls=below' width=720 height=405
</iframe>
raptor.api.play();

// Webgl texture attached to an html5 video iframe
var query = $('.playerframe').contents().find('.player-iframe').contents();
video = query.find('#video_html5_1').get(0);
var texture = gl.createTexture();
gl.bindTexture(gl.TEXTURE_2D, texture);
gl.texParameteri(gl.TEXTURE_2D, gl.TEXTURE_MIN_FILTER, gl.LINEAR);
gl.texParameteri(gl.TEXTURE_2D, gl.TEXTURE_MAG_FILTER, gl.LINEAR);
gl.texParameteri(gl.TEXTURE_2D, gl.TEXTURE_WRAP_S,    gl.CLAMP_TO_EDGE);
gl.texParameteri(gl.TEXTURE_2D, gl.TEXTURE_WRAP_T,    gl.CLAMP_TO_EDGE);

// Apply the video as a 2D texture to an Webgl surface, every frame
function animate()
{
gl.activeTexture(gl.TEXTURE0);
gl.bindTexture(gl.TEXTURE_2D, texture);
gl.texImage2D(gl.TEXTURE_2D, 0, gl.RGB, gl.RGB, gl.UNSIGNED_BYTE, video);

gl.bindBuffer(gl.ARRAY_BUFFER, planeBuffer);
gl.vertexAttribPointer(vx_ptr, 2, gl.FLOAT, false, 0, 0);
gl.bindBuffer(gl.ELEMENT_ARRAY_BUFFER, planeArrayBuffer);
gl.drawElements(gl.TRIANGLES, 6, gl.UNSIGNED_SHORT, 0);

// Browser calls this every frame
window.requestAnimationFrame(animate);
} animate();
```

FIG. 13

DYNAMIC VIDEO EFFECTS FOR INTERACTIVE VIDEOS

CROSS REFERENCE TO RELATED APPLICATIONS

The present application claims the benefit under 35 U.S.C. § 119(e) to U.S. Provisional Patent Application No. 62/099,393, which was filed on Jan. 2, 2015, and to Provisional Patent Application No. 62/156,724, which was filed on May 4, 2015, which applications are incorporated by reference as if fully disclosed herein.

FIELD

The present disclosure relates generally to systems and methods for providing dynamic effects in an interactive video. More particularly, the present disclosure includes systems and methods for providing dynamic selectors and transitions in an interactive video.

BACKGROUND

Videos in production today typically progresses in a linear fashion from beginning to end without receiving user input that affects the progression of the video. In contrast, interactive videos present users with selectable options at certain branching points in the video. Based on selections made by the user, the interactive active video may progress through various video segment branches. The various possible paths that may be taken through the various possible video segment branches make up a non-linear video structure that may be navigated by user selections. In one respect, interactive videos may be used as a teaching tool that instructs or educates the viewer regarding the results or consequences of certain choices. In this and other contexts, the effectiveness of the interactive video may depend on the manner in which certain features of the interactive video are presented to the viewer. Thus, it may be desirable to present certain interactive video features, such as the selectable options and/or the transitions between video segments, in a manner that contributes to the effectiveness of the interactive video.

SUMMARY

In one aspect, the present disclosure is directed to a method of displaying an interactive video that includes rendering and playing a base video having at least one selector for an outcome video, receiving input selecting the at least one selector, and transitioning to the outcome video while playing both the base video and the outcome video on particular portions of a display area. Some implementations include rendering and playing both the base video and the outcome video after the transitioning is complete. Some implementations include rendering and playing the outcome video and not the base video after the transitioning is complete.

In some implementations, transitioning to the outcome video includes playing the base video and the outcome video on opposing side of a three dimensional object that flips during the transition. In some implementations, transitioning to the outcome video includes fading video windows into and out of a foreground during the transition. In some implementations, transitioning to the outcome video includes cross dissolving the base and the outcome video. In some implementations, the selector is an object in the base video.

In some implementations, the selector is a surface in the base video. Some implementations include applying a video effect to the base video to indicate a location of a selector in the base video. In some implementations, applying a video effect includes distorting a surface of the base video. In some implementations, applying a video effect includes adding a color to a portion of the base video that includes the selector.

In another respect, the present disclosure is directed to a system for displaying an interactive video that includes at least one processor, at least one memory operably linked to the at least one processor, wherein the at least one memory comprises instructions, which when executed on the at least one processor, cause the processor to render and play a base video having at least one selector for an outcome video, receive input selecting the at least one selector, transition to the outcome video while playing both the base video and the outcome video on particular portions of a display area. In some implementations, the at least one memory includes further instructions, which when executed on the at least one processor, cause the processor to render and play both the base video and the outcome video after the transitioning is complete. In some implementations, the at least one memory includes further instructions, which when executed on the at least one processor, cause the processor to render and play the outcome video and not the base video after the transitioning is complete.

In some implementations, transitioning to the outcome video includes playing the base video and the outcome video on opposing sides of a three dimensional object that flips during the transition. In some implementations, transitioning to the outcome video includes fading webpages into and out of a foreground during the transition. In some implementations, transitioning to the outcome video includes cross dissolving the base and the outcome video.

In some implementations, the selector is an object in the base video. In some implementations, the selector is a surface in the base video. In some implementations, the at least one memory includes further instructions, which when executed on the at least one processor, cause the processor to apply a video effect to the base video to indicate a location of a selector in the base video. In some implementations, applying a video effect includes distorting a surface of the base video. In some implementations, applying a video effect includes adding a color to a portion of the base video that includes the selector.

In another respect, the present disclosure is directed to a method of displaying an interactive video that includes displaying a selector object associated with an interactive video, receiving user input indicating a user interaction with at least one surface of the selector object, and rendering and playing a video segment responsive to the user interaction with the at least one surface of the selector object. In some implementations, the selector object is an object in a base video of the interactive video, and rendering and playing a video segment responsive to the user interaction includes transitioning to an outcome video while playing both the base video and the outcome video on particular portions of a display area.

In some implementations, the selector object and the interactive video are displayed together in a display area with the selector object being adjacent to the interactive video. In some implementations, the selector object is a graphical rendering of a three-dimensional object, the selector object including a selector mechanism rendered on at least one surface of the three-dimensional object, wherein the user interaction with the at least one surface includes a user interaction with the selector mechanism. Some implementations include receiving user input that specifies a movement of the selector object, and rendering the selector object including effecting a movement of the selector object responsive to the user input, wherein the movement of the selector object brings the selector mechanism into a location where the selector mechanism is capable of being engaged by a user.

In some implementations, the selector mechanism is a first selector mechanism and the selector object further includes a second selector mechanism rendered on at least one surface of the three-dimensional object, the method further including rendering a first interactive video segment responsive to a user selection of the first selector mechanism, and rendering a second interactive video segment responsive to a user selection of the second selector mechanism. Some implementations further include rendering the selector mechanism to reflect activity in the interactive video segment. Some implementations further include rendering the selector mechanism as a liner path along the selector object, wherein rendering the selector mechanism to reflect activity in the interactive video segment includes moving an object along the linear path.

In another aspect, the present disclosure is directed to a system for displaying an interactive video that includes at least one processor, at least one memory operably linked to the at least one processor, wherein the at least one memory includes instructions, which when executed on the at least one processor, cause the processor to display a selector object associated with an interactive video, receive user input indicating a user interaction with at least one surface of the selector object, and render and play a video segment responsive to the user interaction with the at least one surface of the selector object. In some implementations, the selector object is an object in a base video of the interactive video, and the at least one memory includes further instructions, which when executed on the at least one processor, cause the processor to render and play a video segment responsive to the user interaction includes transitioning to an outcome video while playing both the base video and the outcome video on particular portions of a display area.

In some implementations, the selector object and the interactive video are displayed together in a display area with the selector object being adjacent to the interactive video. In some implementations, the selector object is a graphical rendering of a three-dimensional object, the selector object including a selector mechanism rendered on at least one surface of the three-dimensional object, wherein the user interaction with the at least one surface includes a user interaction with the selector mechanism. In some implementations, the at least one memory includes further instructions, which when executed on the at least one processor, cause the processor to receive user input that specifies a movement of the selector object, and render the selector object including effecting a movement of the selector object responsive to the user input, wherein the movement of the selector object brings the selector mechanism into a location where the selector mechanism is capable of being engaged by a user.

In some implementations, the selector mechanism is a first selector mechanism and the selector object further includes a second selector mechanism rendered on at least one surface of the three-dimensional object, the at least one memory includes further instructions, which when executed on the at least one processor, cause the processor to render a first interactive video segment responsive to a user selection of the first selector mechanism, and render a second interactive video segment responsive to a user selection of the second selector mechanism. In some implementations, the at least one memory includes further instructions, which when executed on the at least one processor, cause the processor to render the selector mechanism to reflect activity in the interactive video segment. In some implementations, the at least one memory includes further instructions, which when executed on the at least one processor, cause the processor to render the selector mechanism as a liner path along the selector object, wherein rendering the selector mechanism to reflect activity in the interactive video segment includes moving an object along the linear path.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

The accompanying drawings, which are incorporated in and constitute a part of the specification, illustrate examples of the disclosure and, together with the general description given above and the detailed description given below, serve to explain the principles of these examples.

The patent or application file contains at least one drawing executed in color. Copies of this patent or patent application publication with color drawing(s) will be provided by the Office upon request and payment of the necessary fee.

FIG. 13 illustrates a simplified code listing for an example video implementation in accordance with the present disclosure.

DETAILED DESCRIPTION

Figure 1:
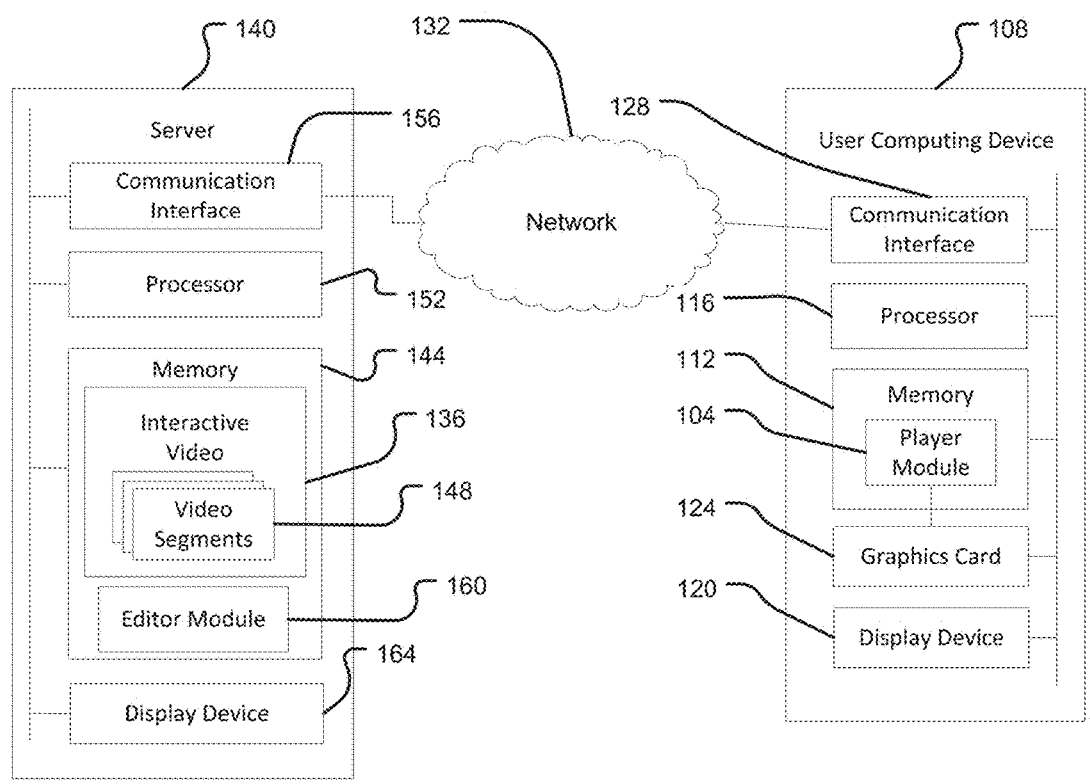
FIG. 1 is a schematic diagram of a computing environment that shows components and features of embodiments in accordance with the present disclosure.

Examples of the disclosure are directed to systems and methods for displaying interactive videos that include improved branch selection and video transition features. Additionally, examples of the disclosure are directed to systems and methods for authoring interactive videos that include improved branch selection and video transition features. As used herein, an "interactive video" is an interactive experience that includes one or more videos, animations, audio files, or other media or multimedia segments that may linked together according to a structure or environment that specifies links to and/o among the various interactive experience segments. In one implementation, an interactive video includes one or more videos that are linked together according to a branching plot structure that specifies links between various interactive video segments. In another implementation, an interactive video includes one or more videos that are independent of each other such that they are not arranged in a particular order or by a particular plot structure.

An interactive video in accordance with the present disclosure may include one or more mechanisms that may be selected or otherwise actuated by a user to select the various interactive video segments that make up the interactive video. These selector mechanisms may take different forms in accordance with various embodiments, but are generally referred to herein as "selectors." In one embodiment, a selector may be a button or other icon that is overlain on or otherwise associated with interactive video output. In other embodiments, a selector may incorporate more complex or dynamic video effects. For example, a selector may be an object or a surface that is itself part of the interactive video. Here, the user may interact directly with an object, surface, or "hot spot" in the video to bring about a response from the interactive video, such as a transition to a subsequent interactive video segment. The interactive video may employ various techniques that indicate to a user which of the various objects, surfaces, or hot spots in the interactive video are "selectors" with which the user may interact. For example, some implementations may distort, darken, blur, or otherwise highlight the selector or the area around the selector to invite the user to interact with the selector. Additional complex or dynamic video effects may also be used to indicate that the user's interaction with the selector has been registered with the system. For example, once the user interacts with the selector, one or more aspects of the video may change such as, objects or surfaces may distort, the entire video area may distort, and so on. These and other selectors that incorporate dynamic video effects are discussed in greater detail below.

When a user interacts with a particular selector in the branching plot structure context, the interactive video may respond by playing or otherwise outputting a subsequent interactive video segment that is associated with the particular branch selected by the user. The user may thus interact with specific selectors corresponding to specific branching points and in this way follow a path through the interactive video. Some segments in the interactive video may provide options for a viewer to select a particular path. Other videos may automatically transition to the next segment in the interactive video sequence. The transition to the next subsequent video may take different forms in accordance with various embodiments. In one embodiment, the video segment having the selector may cease playing and the next subsequent video corresponding to the chosen selector may begin playing in the same video display area. In other embodiments, the transition to the next subsequent video may incorporate more complex or dynamic video effects. For example, the video segment having the selector may continue playing in one portion of the video display area, while the next subsequent video may begin playing in another portion of the video. In some embodiments, the video having the selector may continue playing in a certain portion of the display area after the transition to the next subsequent video is complete. These and other dynamic video transition effects are discussed in greater detail below.

In some embodiments, a selector object may be a graphical representation of a three-dimensional object. A three-dimensional selector object may include one or more selector mechanisms that may be arranged on one or more surfaces of the three-dimensional selector object. The three-dimensional selector object may be oriented via user input such that the user may access the various selector mechanisms that are arranged on the various surfaces of the three-dimensional selector object. The selector mechanism may then be selected through further user input. A user may engage or enable the interactive video via the various selector mechanism that are arranged on the various surfaces of the three-dimensional selector object. For example, the three-dimensional selector object may include a first selector mechanism that may be selected to play a first interactive video segment, a second selector mechanism that may be selected to play a second interactive video segment, and so on. A selector object or a selector mechanism associated with a selector object may also be used to reflect activities that occur in an associated interactive video. In one implementation, progress of an interactive video or interactive video segment may be reflected by movement of objects or other video effects in an associated selector object or selector mechanism.

FIG. 1 is a schematic diagram of a computing environment that shows components and features of embodiments in accordance with the present disclosure. FIG. 1 includes a player module 104 that may be generally configured to provide a run-time environment for an interactive video. As shown in FIG. 1, the player module 104 may be configured to execute on a user computing device 108. Here, the player module 104 may be embodied as computer executable code that is stored in a memory device 112 associated with the user computing device 108. The player module 104 may be configured to execute on the processor 116 so as to provide video or other output to a display device 120 through a graphics card 124 or similar component. The user computing device 108 may include a communication interface 128 that provides a mechanism through which the player module 104 or other component of the user computing device 108 may communicate with other computing devices. In one embodiment, the player module 104 communicates with other computing devices across a network 132.

The player module 104 may provide a run-time environment for an interactive video 136 that is associated with a server 140 or other separate computing device. The interactive video 136 may reside as computer code on a memory device 144 associated with the server 140. The interactive video 136 may include a plurality of video segments 148 that correspond to the various branches of the interactive video 136. The memory device 144 may be associated with a processor 152 that facilitates access to the interactive video 136 and/or one or more of the interactive video segments 148. The server 140 may include a communication interface 156 that provides a mechanism through which the interactive video 136 may be accessed by a separate computer or computer component, such as the user computing device 108 or the player module 104 executing on the user computing device 108. In one embodiment, the player module 104 communicates with the server 140 across a network 112 to access the interactive video 136 and/or one or more interactive video segments 148.

The player module 104 may be implemented using Hyper Text Markup Language (HTML) or other browser executable code. Generally, the player module 104 is configured to be loaded and run by a browser associated with the user computing device 108 without the need to load or enable additional plug-ins or the like. The player module 104 is additionally configured to directly access the video card 124 of the user computing device 108. More specifically, the player module 104 is configured to bypass the browser's video rendering engine and to provide video output data directly to the hardware video card 124. Because the player module 104 accesses the video card 124, the player module 104 is able to render the video on-the-fly, as the video is playing. This functionality allows the player module 104 to produce the various dynamic selector and transition video effects discussed herein. For example, the player module 104 can play a video having a selector and because the video is rendered on the fly, the video can respond in real time with dynamic effects that are responsive to user interactions with the video. When a transition is called for by a user interaction with a selector, the player module 104 may render the video having the selector and the next subsequent video on the fly such that both videos may play simultaneously on different portions of the display area.

Figure 2:
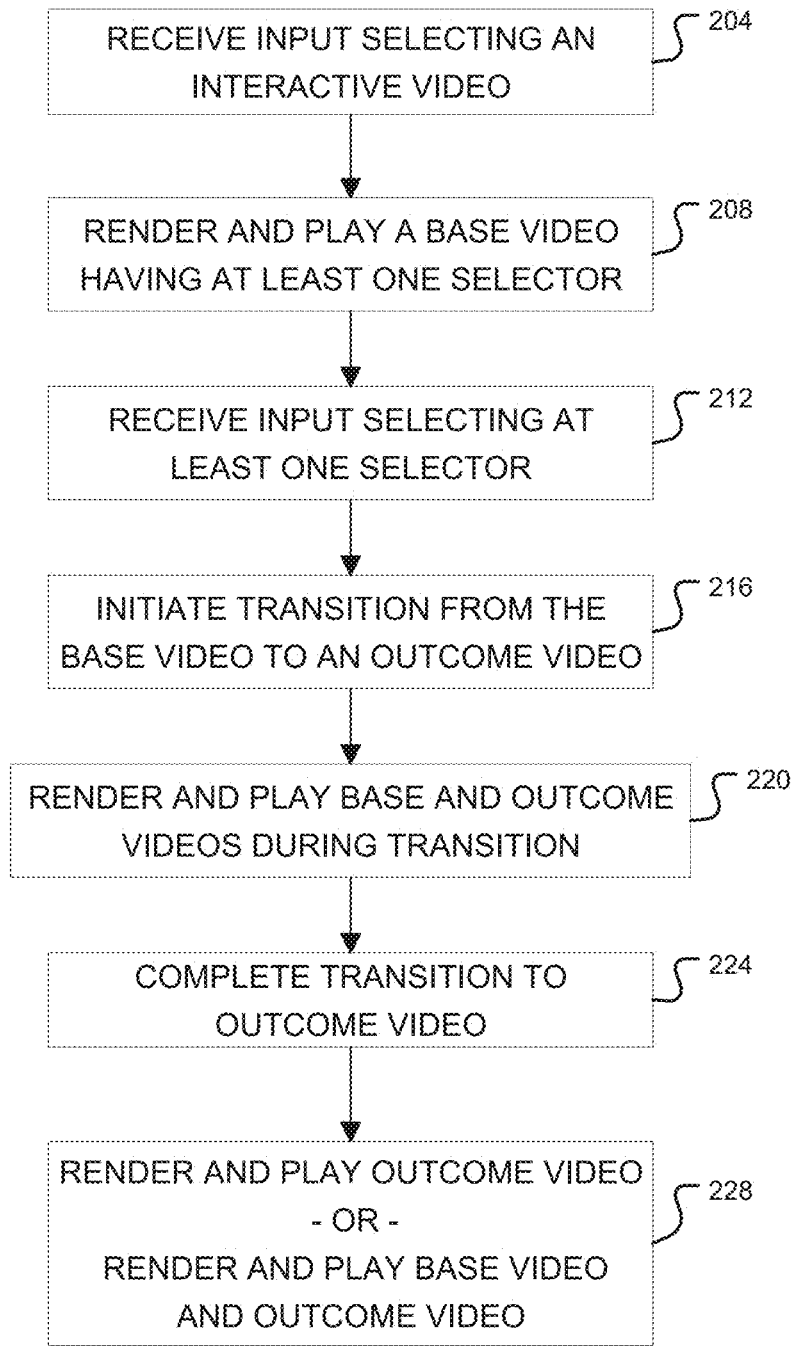
FIG. 2 is a flow chart that illustrates various operations executed by a player module in accordance with embodiments of the present disclosure.

FIG. 2 is a flow chart that illustrates various operations executed by a player module 104 in accordance with embodiments of the present disclosure. Generally, FIG. 2 illustrates operations of the player module 104 that function to play an interactive video segment having at least one selector and to play a subsequent interactive video segment responsive to a user interaction with the selector. As used herein, the interactive video segment having the at least one selector may be referred to as a "base video." Additionally, the term "outcome video" may be used to refer to the interactive video segment that is played in response to user interactions with a selector in a base video. It should be appreciated these terms are not mutually exclusive. For example, a particular or first outcome video may have selectors that a user may interact with to choose additional outcome videos. Thus, the first outcome video may be base video as to the additional outcome video.

Referring to FIG. 2, in operation 204, the player module 104 may initially receive input selecting an interactive video. The user selection of the interactive video may occur, for example, by the user clicking on a displayed link, downloading a file, selecting an icon, and so on. In some embodiments, the user selection of the interactive video may occur inside a browser running on a user computing device 108. Here, the user may select a link in a webpage or other document that is accessible by the browser. The link may direct the browser to an interactive video 136 that resides on a server 140 or other remote computing device. Following this direction, the browser may download at least one video segment 148 of the interactive video 136. In some embodiments, the browser may avoid unnecessary network transactions by downloading interactive video segment as needed responsive to user interactions with particular selectors.

In operation 208, the player module 104 renders and plays a base video having at least one selector. Here, the player module 104 may play an initial video segment 136 in the interactive video 144. Alternatively, the player module 104 may play a base video as the result of a user interaction with a selector in a previous base video. In either case, the player module 104 accesses the graphics card 124, by-passing the browser's rendering engine. Through its direct access to the graphics card 124, the player module 104 may display the selector as an object or surface inside of the base video. Here, the player module 104 may invite user interaction with the selector by distorting, blurring, darkening, or otherwise emphasizing the selector or the area around the selector. Because the base video segment is rendered on the fly, the emphasis provided by the player module 104 may change in response to user input. Once the use interacts with a selector, for example by way of a mouse click, this selection is registered by the system in operation 212.

In operation 216, the player module 104 initiates a transition from the base video to an outcome video. Through its direct access to the graphics card 124, the player module 104 may simultaneously play both the base video and the outcome video on different portions of a display area of the display device 120. Thus, in operation 220, the player module 104 renders and plays the base video and the outcome video during transition period. In operation 224, the player module 104 completes the transition to the outcome video. In some embodiments, the base video no longer plays once the transition takes place. Other embodiments implement a "video on video" effect where the outcome video plays over a portion of the base video. Thus, in operation 228, the player module 104 renders and plays the outcome video; or, the player module 104 renders and plays the base video and outcome video. Operation 208 may again be executed after operation 228 such that the outcome video plays as a base video.

Figure 3A:
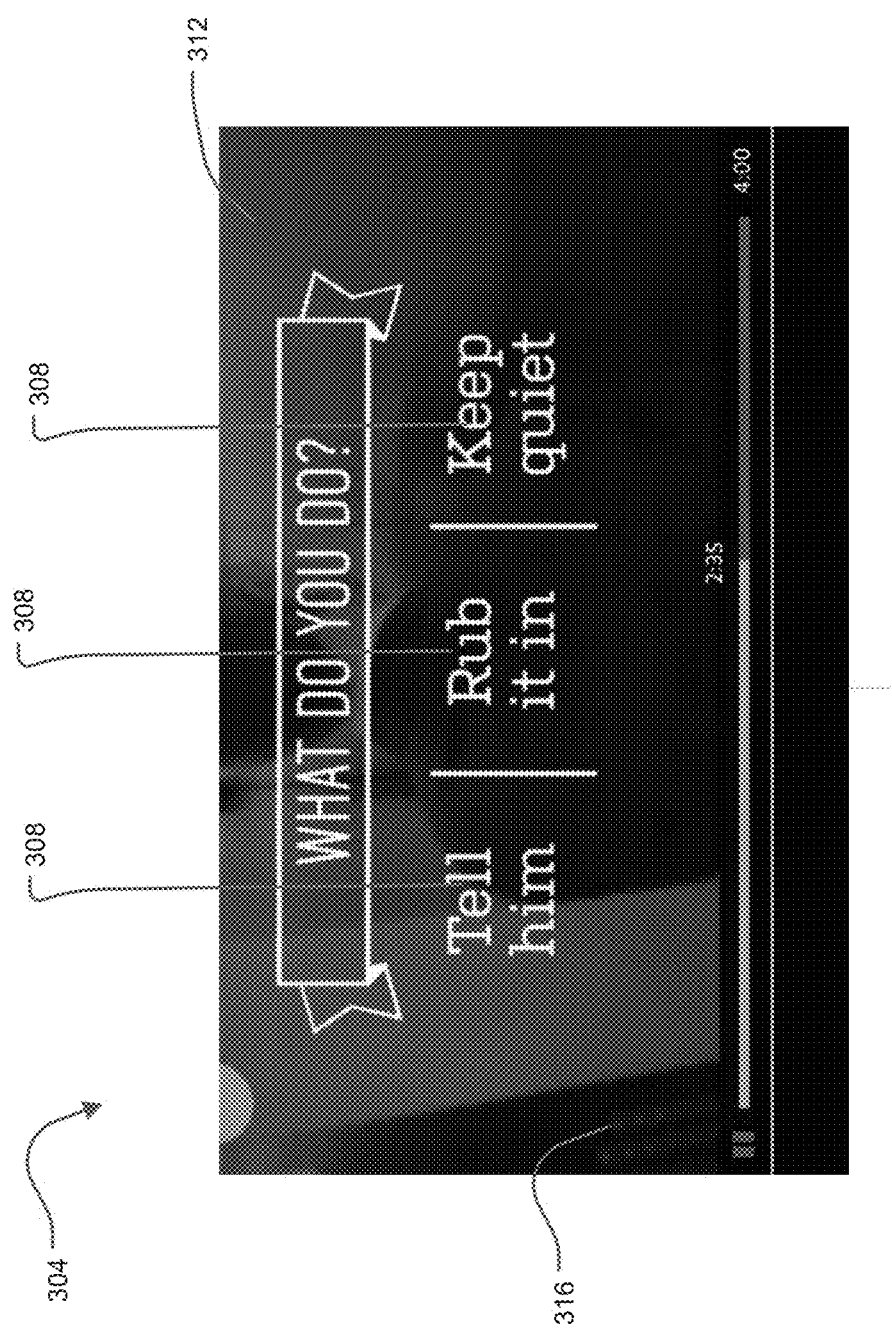
FIGS. 3A-3F illustrate an example interactive video that includes selectors and transitions in accordance with the present disclosure.
Figure 3B:
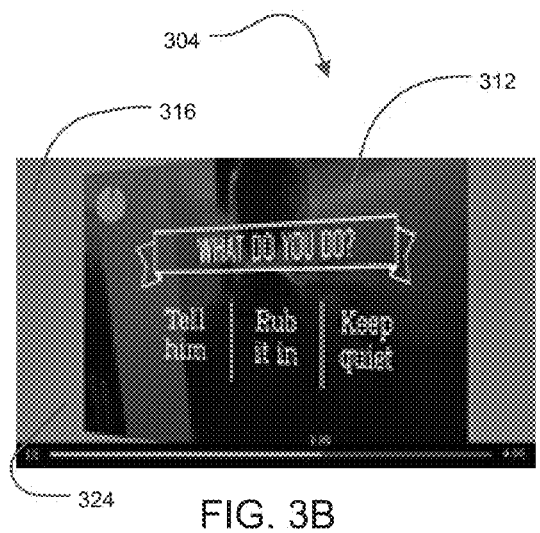
Figure 3C:
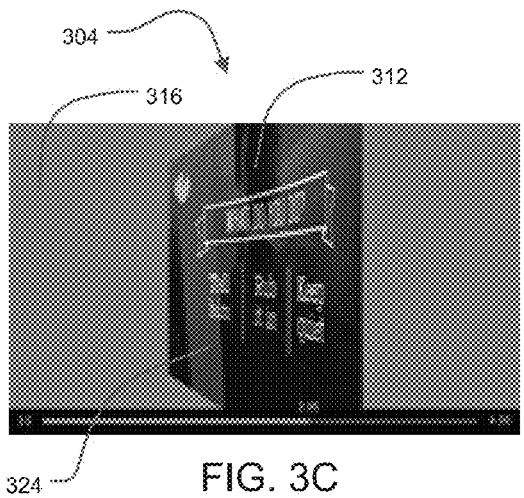
Figure 3D:
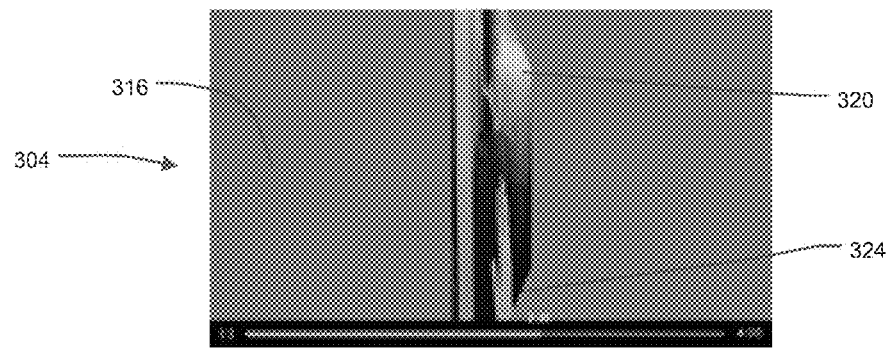
Figure 3E:
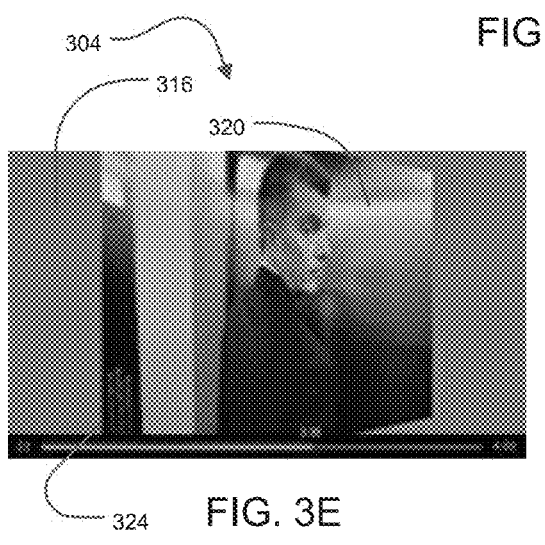
Figure 3F:
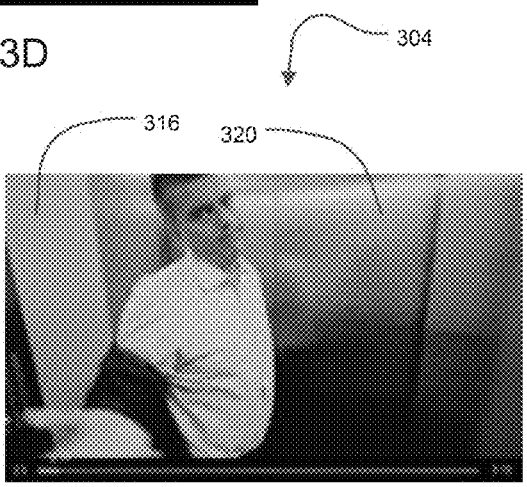

FIGS. 3A-3F illustrate an example interactive video 304 that includes selectors and transitions in accordance with the present disclosure. The interactive video 304 of FIGS. 3A-3F includes selectors implemented as buttons 308 overlain on a base video segment 312. As shown in FIG. 3A, the base video segment 312 initially occupies the entire display area 316. As shown in FIGS. 3B-3E, the interactive video 304 transitions to an outcome video segment 320 in response to a user interaction with a button 308 displayed in the base video segment 312. Here, the interactive video 304 displays a rotating object 324 that includes the base video segment 312 and the outcome video segment 320 playing on opposing sides of the object 324. In FIG. 3F, the transition between the video segments is complete and the outcome video segment 320 occupies the entire display area 316.

Figure 4A:
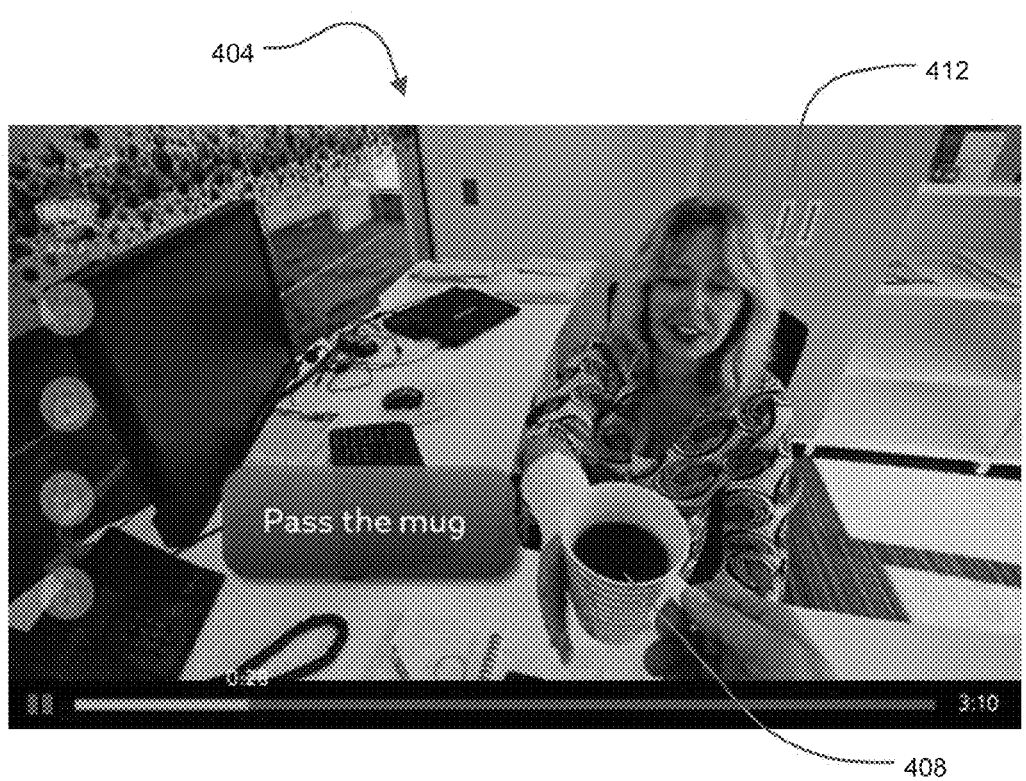
FIGS. 4A-4D illustrate another example interactive video 404 that includes selectors in accordance with the present disclosure.
Figure 4B:
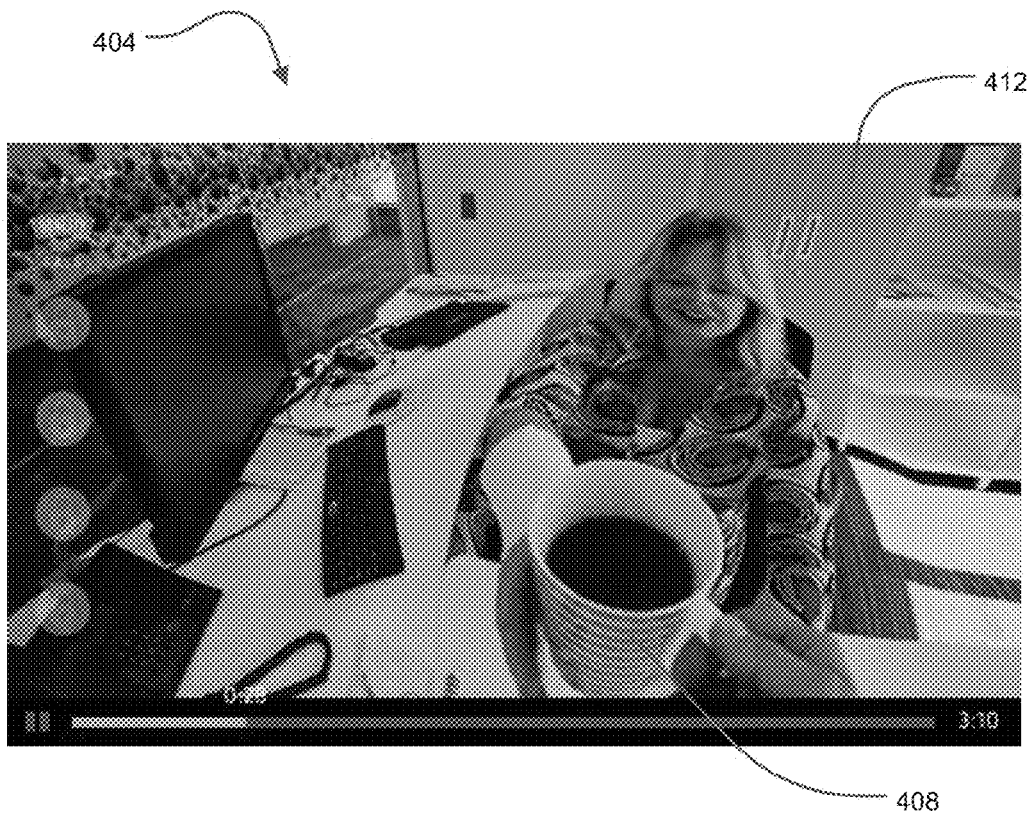
Figure 4C:
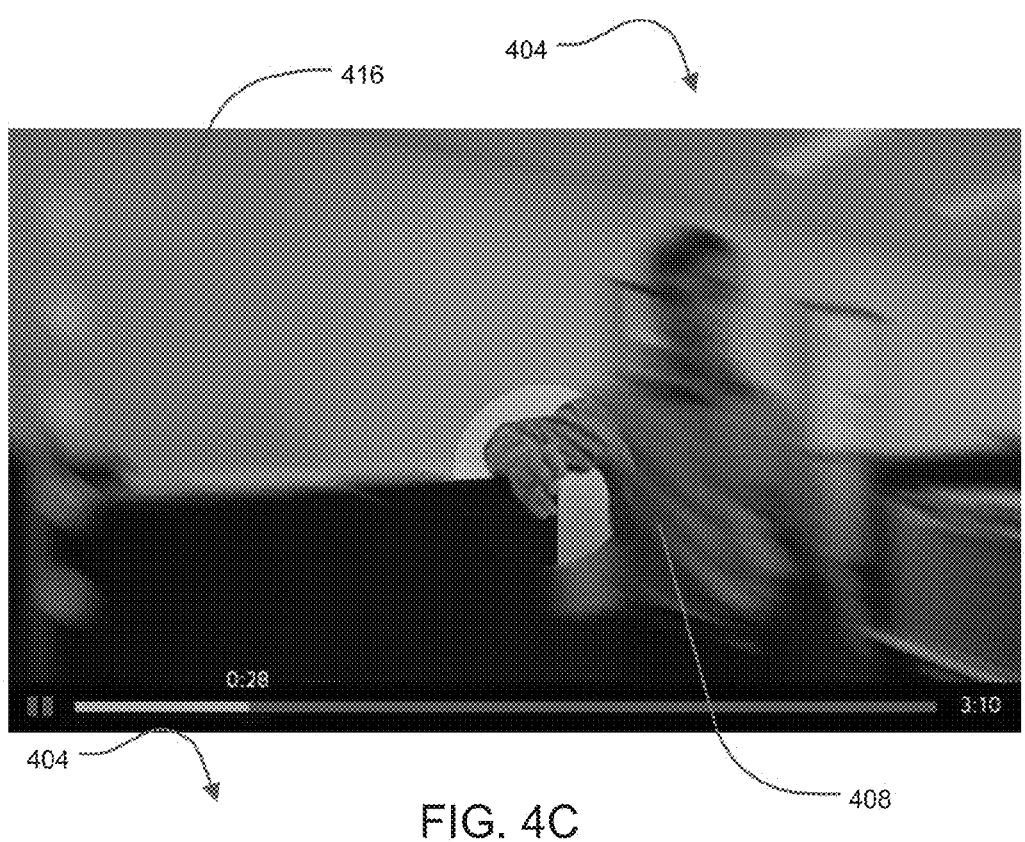
Figure 4D:

FIGS. 4A-4D illustrate another example interactive video 404 that includes selectors in accordance with the present disclosure. FIGS. 4A-4D illustrate an interactive video 404 having a selector implemented as an object 408 in a base video segment 412. Here, the selector object 408 is a coffee mug held by a women sitting behind a desk. The interactive video 404 indicates that the object 408 is a selector by dynamic video effects that highlights the object 408, inviting the user to interact with the object 408. As can be seen in FIG. 4B, the base video segment 412 includes spherical distortions that are substantially centered on the object 408. As shown in FIGS. 4C-D, the interactive video 404 transitions to an outcome video segment 416 in response to a user interaction with the object 408 displayed in the base video segment 412. As the outcome video segment 416 begins to play, portions of the outcome video segment 416 are blurred to highlight the object 408, emphasizing that selecting the object 408 caused the transition to the outcome video segment 416.

Figure 5:
FIG. 5 illustrates another example interactive video that includes selectors in accordance with the present disclosure.

FIG. 5 illustrates another example interactive video 504 that includes selectors in accordance with the present disclosure. The interactive video 504 has a selector implemented as an object 508 in a base video segment 512. Here, the selector object 508 is the head of a man sitting behind a desk. The interactive video 504 indicates that the object 508 is a selector by dynamic video effects that highlight the object 508, inviting the user to interact with the object 508. As can be seen in FIG. 5, the base video segment 512 includes a color highlight that is substantially centered on the object 508. The interactive video 504 transitions to an outcome video segment 516 in response to a user interaction with the object displayed in the base video segment 512. Here, the interactive video 504 implements a "video-on-video" functionality where the outcome video segment 516 plays over a portion of the base video segment 512.

Figure 6A:
FIGS. 6A-6D illustrate another example interactive video that includes selectors and transitions in accordance with the present disclosure.
Figure 6B:
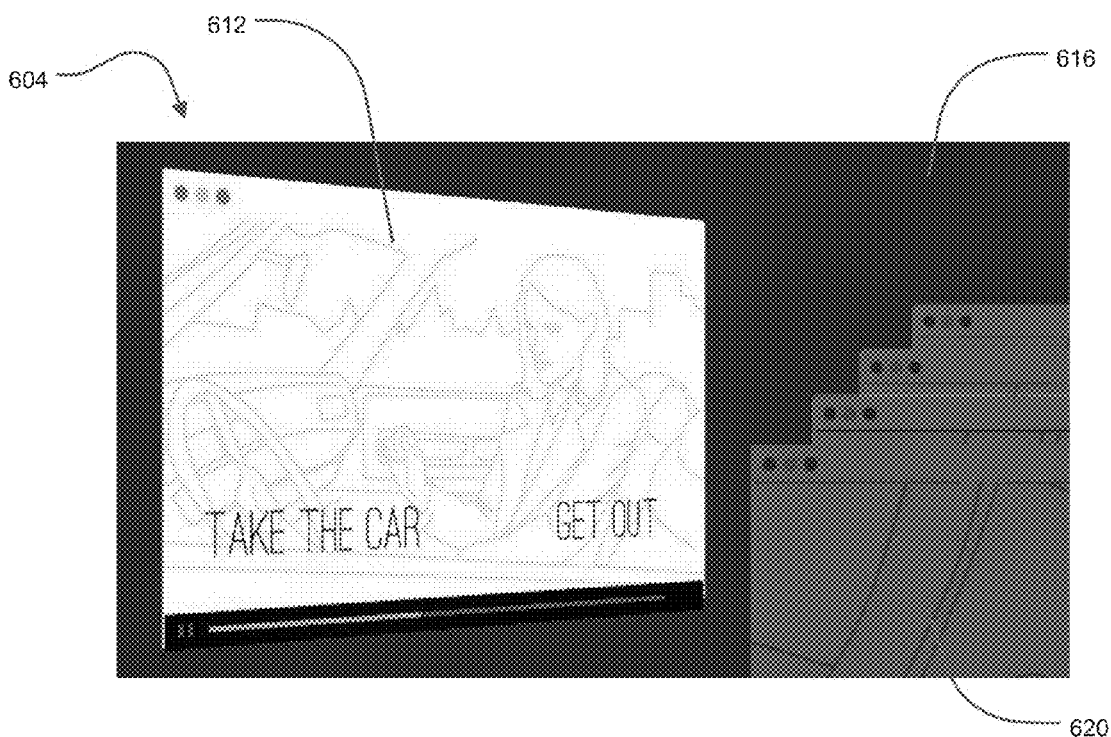
Figure 6C:
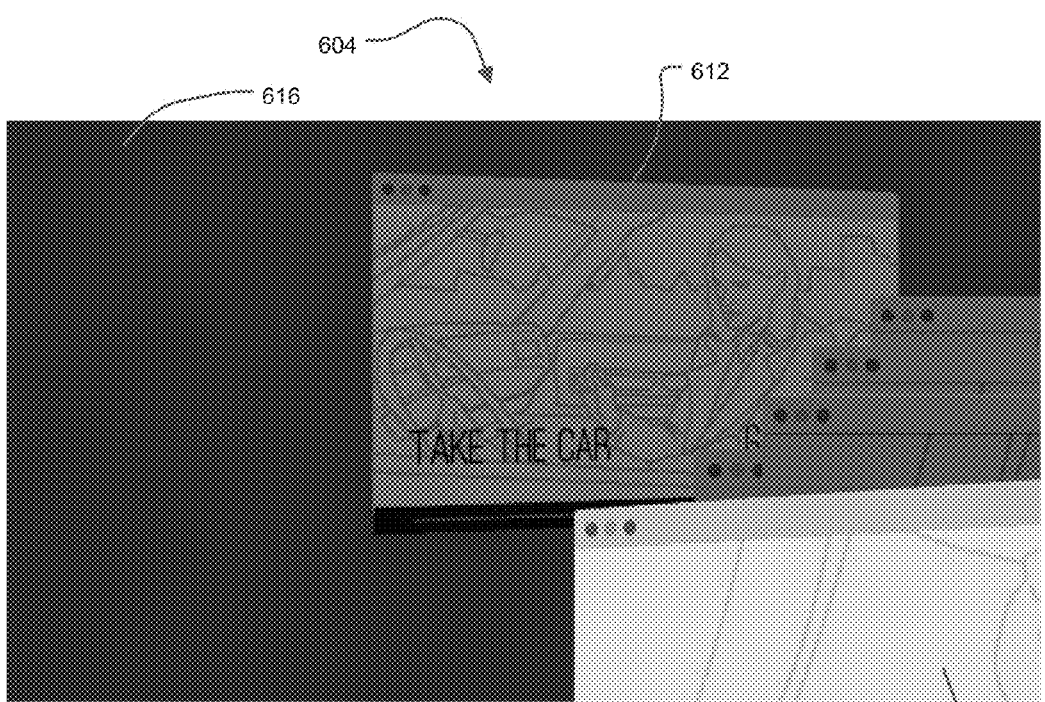
Figure 6D:
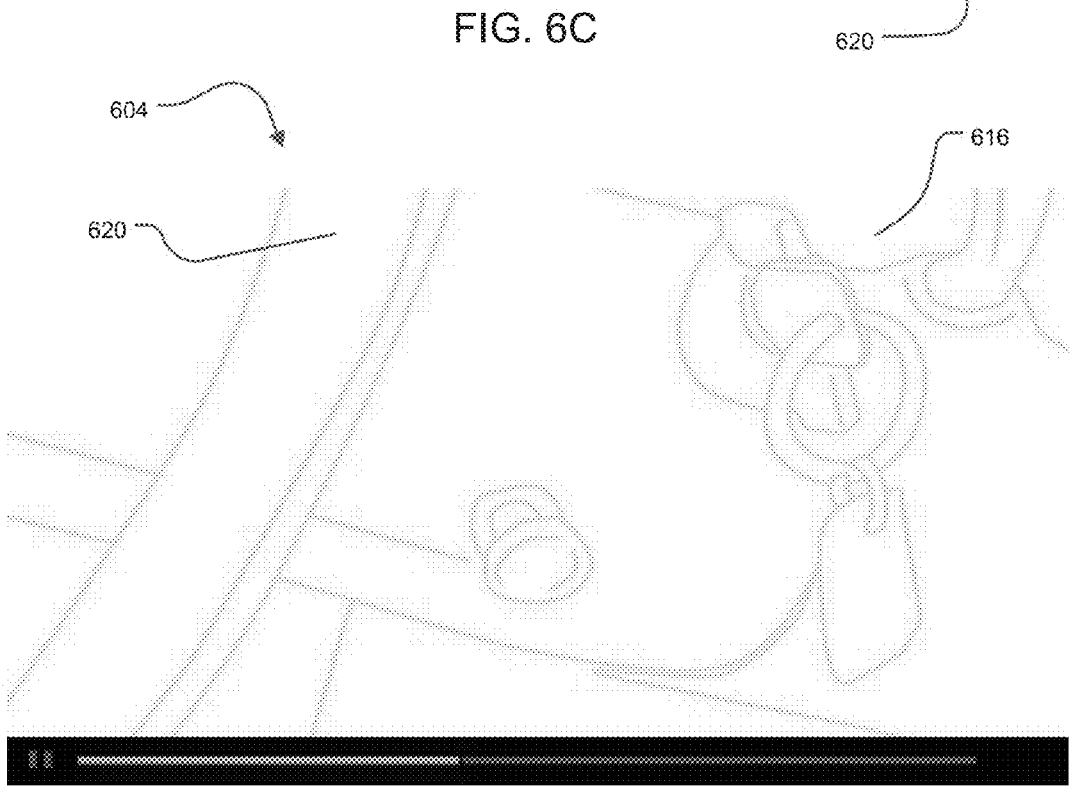

FIGS. 6A-6D illustrate another example interactive video 604 that includes selectors and transitions in accordance with the present disclosure. The interactive video 604 of FIGS. 6A-6D includes selectors implemented as text 608 overlain on a base video segment 612. As shown in FIG. 6A, the base video segment 612 initially occupies the entire display area 616. As shown in FIGS. 6B-6C, the interactive video 604 transitions to an outcome video segment 620 in response to a user interaction with a text item 608 displayed in the base video segment 612. Here, the interactive video 604 displays the base video segment 612 and the outcome video segment 620 in browser pages or video windows that, respectively, fade into the background and come into foreground simultaneously in different regions of display area 616. In FIG. 6D, the transition between the video segments is complete and the outcome video segment 620 occupies the entire display area 616.

As mentioned, the present disclosure is additionally directed to systems and methods for authoring interactive videos that include improved branch selection and video transition features. In this regard, an editor module 160 may provide a graphical user interface and/or other tools that allow a user to edit and create an interactive video. As shown in FIG. 1, the editor module 160 may be configured to execute on a server 140 or other computing device. Here, the editor module 160 may be embodied as computer executable code that is stored in a memory device 144 associated with the server 140. The editor module 160 may be configured to execute on the processor 152 so as to provide a graphical user interface or other output through a display device 164. Additionally, the editor module 160 may be configured to provide output to other computing devices through a communication interface 156. The editor module 160 is shown in FIG. 1 as running on the same computing device where the interactive video 136 resides by way of example and not limitation. In some implementations, the editor module 160 and the interactive video 136 run on separate computing devices.

The editor module 160 may provide an environment for a user to create and edit an interactive video. Here, the editor module 160 allows a user to edit a map or other diagram that sets forth the branching structure of the interactive video. The map or other diagram may include nodes that each represent or otherwise correspond to a particular segment of the interactive video. The editor module 160 may also allow a user to add or configure interconnections between nodes of the map or other diagram provided by the editor. The interconnections generally represent various paths that may be taken through the interactive video based on selections made by the user of the interactive video. Thus, the map or other diagram provided by the editor module 160 may be referred to herein a "branching sequence map." In some instances, a branching sequence map includes nodes that are not associated with media or that are not interconnected with other nodes.

In one respect, the editor module 160 may be configured for use in initial preproduction stages where one or more interactive experience segments have not yet been filmed, animated, or otherwise produced. For those interactive experience segments that have not yet been produced, a user may upload placeholder media into the node that represents content that will ultimately be included in the corresponding interactive video segment. For example, the user may upload one or more still images or audio clips and associate those media items with particular nodes. Additionally, the editor module 160 may be used to associate script segments or other text with particular nodes in the map or other diagram.

The editor module 160 may also be configured to provide output in the pre-production stages. Here, the editor module 160 may provide output that diagrams or otherwise represents a prospective interactive video. The output provided at this stage is generally referred to as a "storyboard." As used herein, a storyboard may include a presentation of the prospective interactive video that includes the various uploaded media items arranged as set forth in the branching sequence map. In one example, a storyboard is a sequence of media items that may be played and/or selected as set forth in the branching sequence map. Here, a viewer may select storyline branches or otherwise interact with the storyboard as would the viewer of the prospective interactive video when such video is ultimately produced and viewed. In this way, the storyboard may function as a demonstration of the prospective interactive video that may be shown to various stakeholders such as customers, investors, or the like. In another example, the editor module 160 may output a storyboard that includes the various uploaded media items arranged in a table or spreadsheet that includes table entries that explain the sequencing of the prospective interactive video as set forth in the branching sequence map. The storyboard output may include blanks or other appropriate indictors in those instances where a node is not associated with media or not interconnected with other nodes.

The editor module 160 module may additionally provide functionality that may be used in producing the interactive video itself. Once the prospective interactive video moves into the production stage, the structures and/or data created during pre-production may be used in producing the interactive video. Specifically, the editor module 160 may be used to upload particular video, audio, animation, or other media segments that have been filmed or recorded during production and that are to be included as part of the interactive experience. Through the operation of the editor module 160, these production segments may be associated with the appropriate node of the branching sequence map that was created in pre-production. Here, the editor module 160 may be used to swap out the placeholder media uploaded in pre-production for the actual production segments. Once the branching sequence map is fully populated with the appropriate production segments, the editor module 160 may be used to further design and implement features of the interactive video such as video effects for certain selectors and video effects for transitions between certain interactive video segments. The editor module 160 may be configured to provide the interactive video itself as output at various stages of production including when the branching sequence map is fully populated and the various video effects are designed and implemented.

Figure 7:
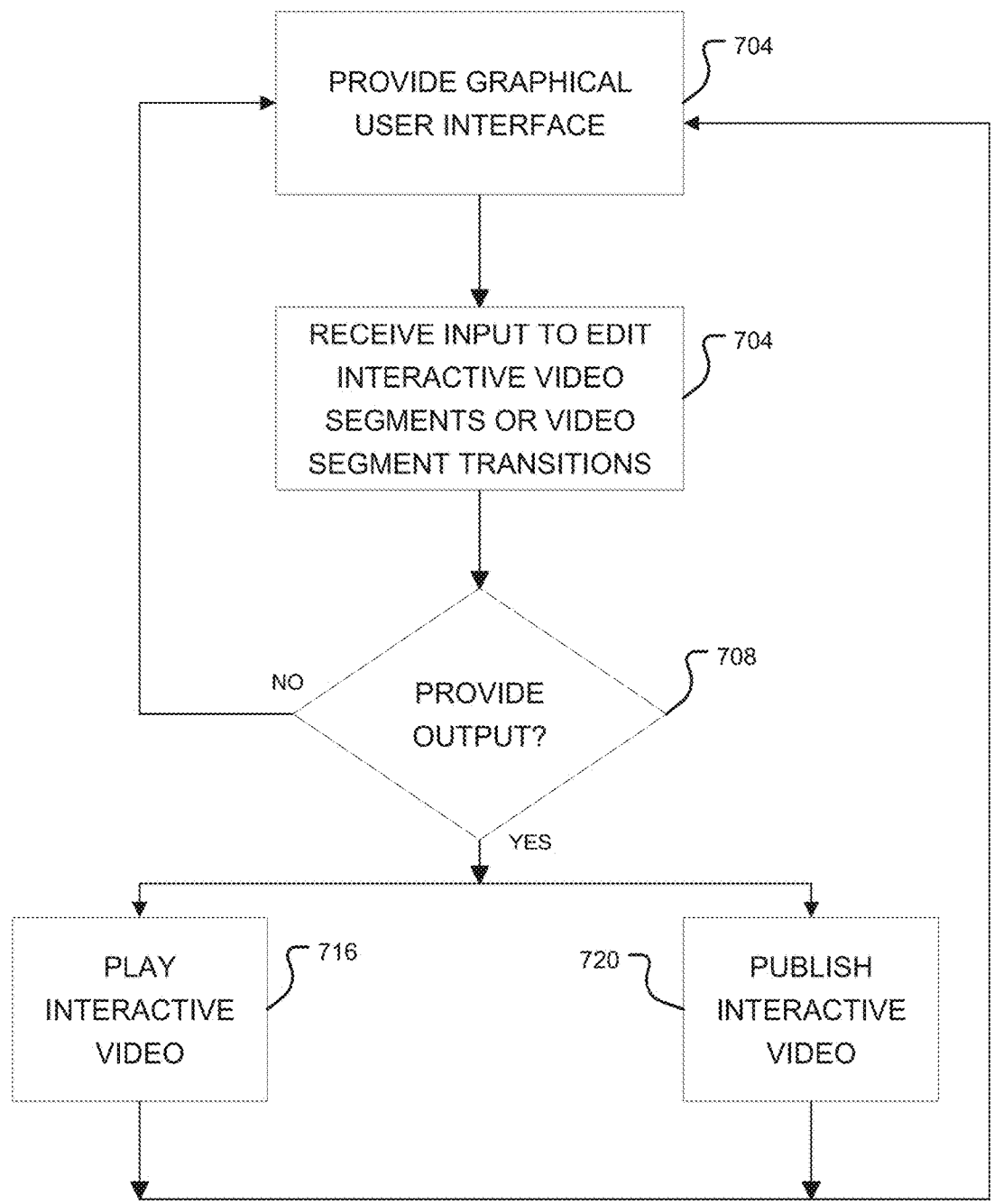
FIG. 7 is a flow chart that illustrates example operations of the editor module shown in FIG. 1.

FIG. 7 is a flow chart that illustrates example operations of the editor module 160 shown in FIG. 1. Initially, in operation 704, the editor module 160 provides a graphical user interface that may be displayed, for example, on the display device 164 associated with a server 140 or other computing device. Generally, the graphical user interface includes one or more different areas including a workspace that allows a user to create a map or other structure that represents an interactive video or a prospective interactive video. The editor module 160 may be configured to allow the user to add or upload media to the structure. In preproduction stages, the uploaded media may be placeholder media that represents various segments of a prospective interactive video. In later stages, the uploaded media may video segments to be used in the production version of interactive video, including design and implementing various video effects for the interactive video. Various implementations and aspects of example graphical user interfaces are described in greater detail below in connection with FIG. 8 through FIG. 10.

In operation 708, the editor module 160 may receive input from a user. The input received in operation 708 may include commands to edit an interactive experience structure and/or to add specific media items to the interactive media structure. In one embodiment, the interactive media structure may be a branching sequence map. In pre-production or initial phases of production, the editor module 160 may receive commands to add placeholder media items to specific nodes of the branching sequence map. For example, the editor module 160 may receive a picture or other image that represents a video clip or other interactive experience segment that is to be filmed or otherwise produced at a later stage of production. In other examples, it may be the case a particular node remains empty. In connection with receiving placeholder media type of input, the editor module 160 may associate the particular media item with the particular node or other location within the branching sequence map, as appropriate. In later phases of production, the editor module 160 may receive the actual video clip or other interactive experience segment that is represented by the place holder media. In connection with receiving this type of input, the editor module 160 may replace the placeholder media with the production segment, as appropriate. The editor module 160 may additionally receive input that edits certain interactive video segments or transitions between interactive video segments. For example, the editor module 160 may receive input that designs or implements selectors and/or video segment transitions to be used in the production version of the interactive video.

In operation 712, the editor module 160 may receive a command that specifies that the module 160 should provide output in a particular form. In the event that no such output command is received, the editor module 160 may continue to provide a graphical user interface, such as in operation 704, and continue to receive input through the graphical user interface, such as in operation 708. If, in operation 712, an output command is received, the editor module 160 may proceed to provide output, as appropriate.

In accordance with various embodiments, the editor module 160 may be configured to provide output in various forms. For example, in operation 716 the editor module 160 may play or otherwise output an interactive video. In pre-production stages, the editor module 160 may play a storyboard version of a prospective interactive video. Here, the editor module 160 may display the various uploaded media items in sequences specified by the branching sequence map. As mentioned, the branching sequence map specifies particular paths through the interactive video, which paths may be selected through particular user choices. Operation 716 may include displaying a particular still image for a particular period of time so as to represent a segment that will be produced at a later stage of production. In later stages, operation 716 may include playing a production version of the interactive experience, including any special video effects such as selectors and segment transitions that have been designed and implemented through the operation of the editor module 160.

As indicated by operation 720, the editor module 160 may also be configured to publish an interactive video. As used herein, an interactive video may be "published" by making the interactive video available to a user computing devices 108 from across a network 132. In pre-production stages, the interactive video may be published to limited audience that can provide feedback on the interactive video. In this way, particular stakeholders or other users may sample early preproduction versions of the interactive experience, provide comments, and so on. Once the interactive video production is complete, the interactive video may be made publically available or otherwise published to its target audience. Once the editor module 160 provides output in one or more forms, the editor module 160 may again be activated to receive input that provides further edits to the interactive video.

Figure 8:
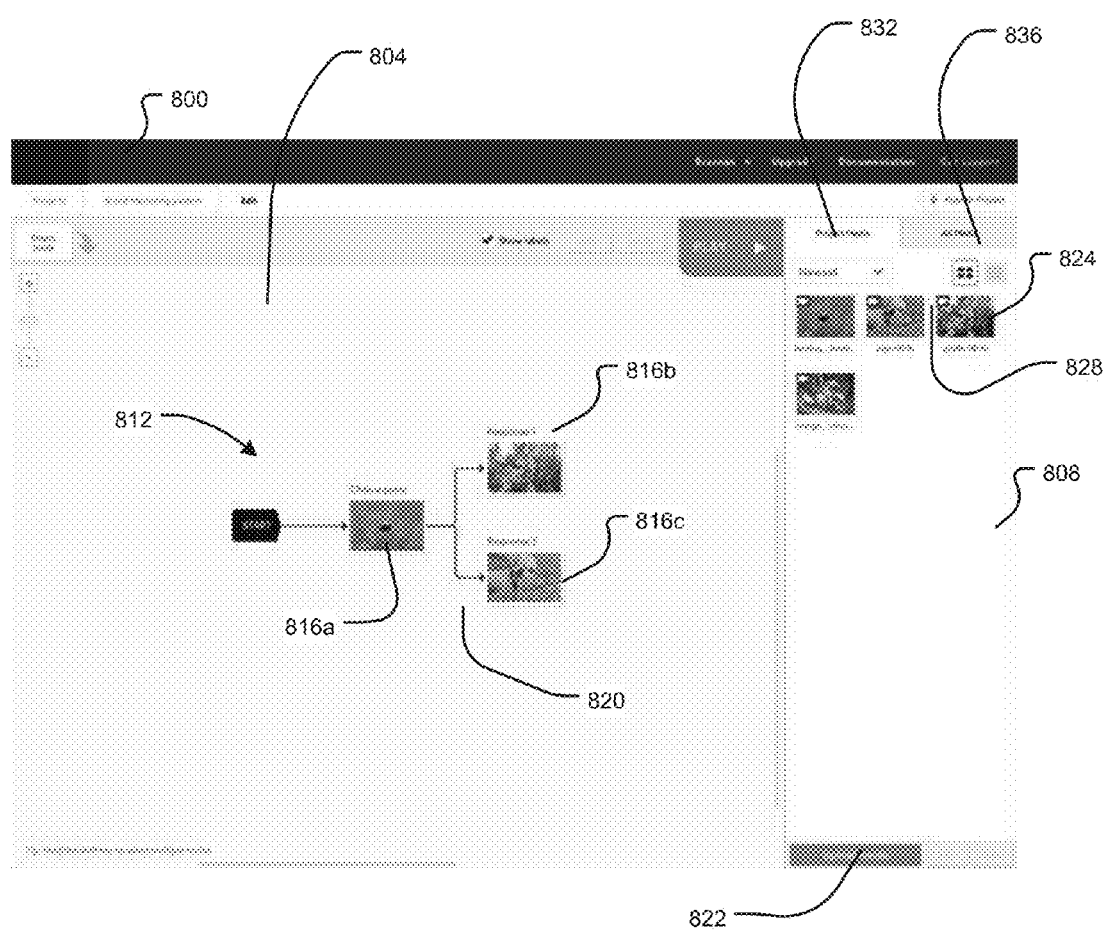
FIG. 8 is a screen shot of an example graphical user interface that may be provided by the editor module shown in FIG. 1.

FIG. 8 is a screen shot of an example graphical user interface 800 that may be provided by the editor module 160. As shown in FIG. 8, the graphical user interface 800 generally includes a workspace 804 and a media area 808. The workspace 804 may include an interactive project structure or branching sequence map 812. The map 812 may include a number of nodes 816*a-c* that are interconnected through the various node connectors 820. The nodes 816*a-c* represent particular segments in an interactive video or in a prospective interactive video. As mentioned, a prospective interactive video may be a preproduction representation of an interactive video that, in some implementation, is to be the ultimate product of the editor module 160. The node connectors 820 represent particular paths between individual nodes 816*a-c*. Thus, the map 812 generally illustrates an overall structure of the interactive video, including a number of individual paths that may be taken through the interactive video.

The various nodes 816*a-c* of the map 812 may be populated by user inputs or other commands that may be entered through the operation of the editor module 160 and the graphical user interface 800. For example, media may be associated with various nodes 816*a-c* through the operation of a media area 808. The media area 808 may include a mechanism, such as the upload media button 822, that may be actuated by a user to cause various media items to be uploaded into the editor module 160. By way of example, FIG. 8 shows a media area 808 that includes a number of media items that have been uploaded into the media area 808. The editor module 160 may be configured to allow users to upload various types of media. For example, the editor module 160 may be configured to allow the user to upload still images, audio clips, and so on. In order to distinguish between various types of media that may be located in the media area 808, each media item 824 may include a media type indicator 828 overlain on top of an icon representing the media item. The media area 808 may include various folders to hold different media items. For example, the media area 808 may include a project media folder 832, an all media folder 836, and so on.

An interactive video produced through the operation of the graphical user interface 800 may provide various selectors or other mechanism for allowing a viewer to make selections that cause the interactive video to transition between video segments. For example, the interactive video may provide icons that are "clickable" or otherwise selectable, voice command prompts that provide for entry of voice commands, and so on. Dynamic video effects may also be used to create selectors out of the objects or surfaces within the interactive video itself. In some implementations, commands may be entered through an application program interface (API) that provides functionality for viewer and/or user inputs from an embedded website. For example, a user may click on an ad, or fill in a form, or click a link, and the video or other interactive experience may respond appropriately. Some interactive experiences include default paths such that no specific user input is required to cause the interactive experience to transition between nodes.

Using the selectors provided programmed with the graphical user interface 800, a viewer or other user of the interactive video may interact with a particular selector within the interactive video when the interactive video plays or otherwise executes. These viewer interactions may operate to cause the interactive video to transition from one node 816a-c to another along paths that are generally represented by the node connector 820. For example, the interactive video may begin with node one 816a. The video or other media that plays in connection with node one 816a may include two selectors that may be displayed at a particular time during the interactive video. Each selector may be configured such that the user of the interactive video may interact with the selector to cause the interactive video to transition to one of node two 816b or node three 816c.

Figure 9A:
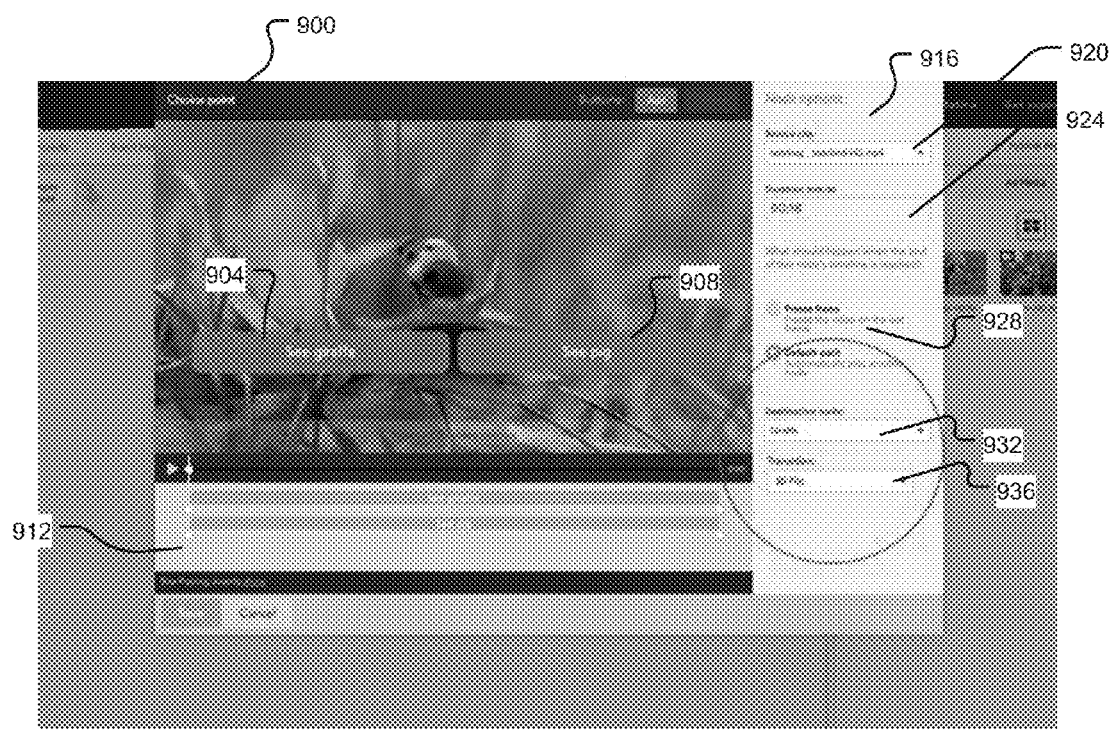
FIGS. 9A-B are screen shots of example node editor windows that may be accessed by through the graphical user interface of FIG. 8.
Figure 9B:
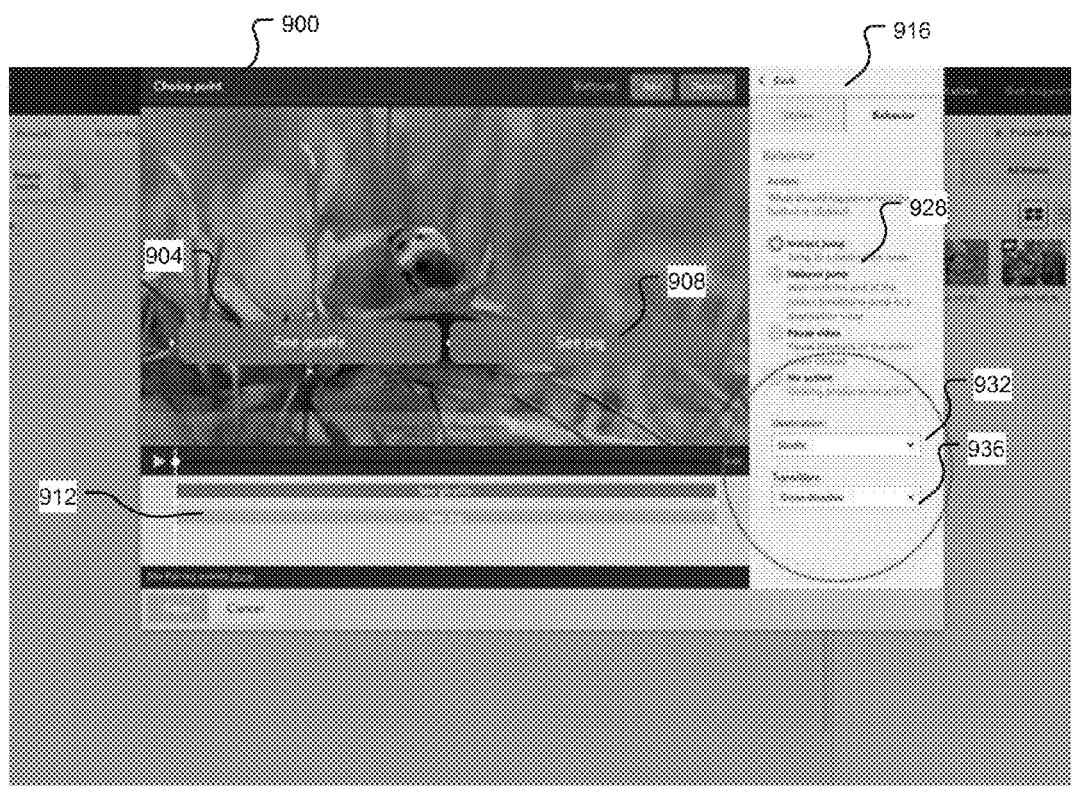

The graphical user interface 800 may include a node editor window as shown in FIGS. 9A-B. A user may access the node editor window 900 through an operation of the workspace 804 shown in FIG. 8. For example, in order to access the node editor window 900 for a particular node 816a-c, a user may select a particular node 816a-c by clicking on or otherwise highlighting a particular node. As shown in FIGS. 9A-B, the node editor window 900 may show one or more selectors as they would appear when the user plays the video segment associated with the selected node. FIGS. 9A-B illustrate an example node editor window 900 for the node three 816a shown in FIG. 8. Thus, the node editor window shows a first selector 904 that, when selected by a viewer of the interactive video, may cause the interactive video to transition to node two 816b. Additionally, the node editor window shows a second selector 908 that, when selected by a viewer of the interactive video, may cause the interactive video to transition to node three 816c. By way of example and not limitation, the selectors 904, 908 shown in FIGS. 9A-B are buttons overlain on the video associated with the first node 816a.

FIGS. 9A-B additionally shows certain features of the node editor window 900 that may be used to program the characteristics or behavior of the selected node. For example, it may be the case that particular selectors 904, 908 are displayed only during a particular portion of the interactive video segment associated with the selected node. Thus, as shown in FIGS. 9A-B, the node editor window 900 may include a button duration indicator 912. The button duration indicator 912 may be adjusted by a user of the editor module 160 to specify the times during the display of media in the selected node that correspond to displaying a particular button 904, 908. The node editor window 600 may also include a node options menu 916 that a user may interact with so as to adjust or change the various behaviors associated with the selected node.

As shown in FIG. 9A, the node options menu 916 may include a source media indicator 920. The source media indicator 920 may be configured to list a file name or other indicator associated with media uploaded to the selected node. The node options menu 916 may additionally include a duration indicator 924, which may be adjusted through user input. Here, a user may specify the amount of time in which video or other media associated with the selected node is intended to run. The duration indicated by the duration indicator 924 may be adjusted in accordance with various adjustments to the interactive experience and may change depending on the running time of the interactive experience segment that ultimately will be associated with the selected node. The node options menu 916 may additionally include a behavior indicator 928, which may be adjusted by a user to set the behavior of the selected node. Here, the user may specify that, once the video or other media associated with the selected node completes, the node either freezes or proceeds directly to a subsequent node according to a default path. FIG. 9B shows additional aspects of the behavior indicator 928 that allow the user to select certain options for the transition to the next node, such as "instant jump," "delayed jump," and so on.

Figure 10A:
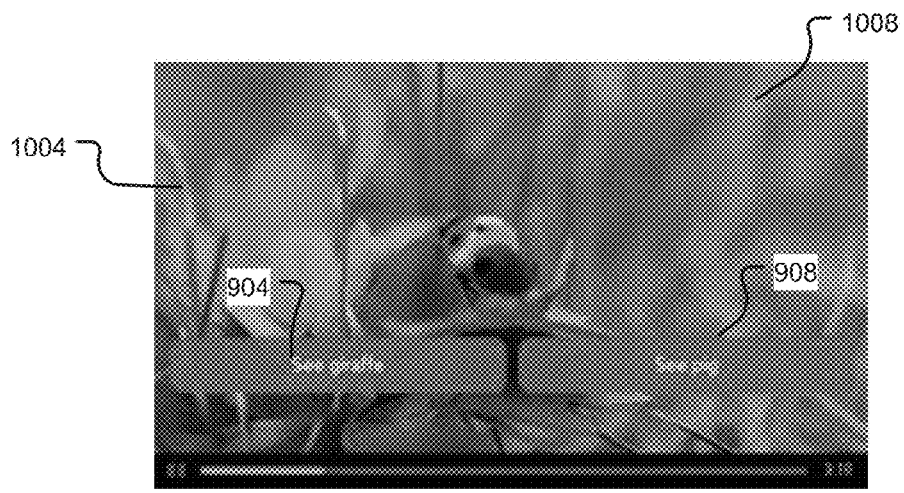
FIGS. 10A-C are screen shots that generally illustrate a cross-dissolve transition.
Figure 10B:
Figure 10C:
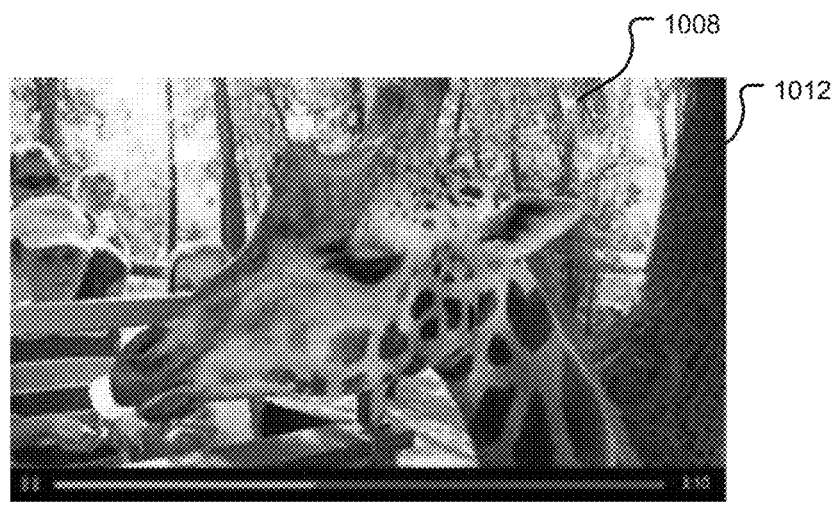

As shown in FIG. 9A-B, the node options menu 916 may additionally include a destination indicator 932. The user may use the destination indicator 932 to specify which of a number of subsequent nodes associated with the interactive experience segments will follow the completion of the selected node. In connection with the destination indicator 932, the node options menu 916 may include a transition selector 936. The transition selector may be used to select a pre-programmed type of transition between the selected node and the destination node specified in the destination indicator 932. The transition selector 936 may be used to select various pre-programmed transitions such as, "cross-dissolve," "3D flip," and so on. FIG. 9B indicates a selection of a cross-dissolve transition between node one 816a and node 816b. The appearance of this cross-dissolve is generally illustrated in FIGS. 10A-C. In FIG. 10A, the base video segment 1004 corresponding to node one 816a initially occupies the entire display area 1008. In FIG. 10B, the base video segment 1004 is shown cross-dissolving with an outcome video segment 1012 that corresponds to node two 816b. In FIG. 10C, the cross-dissolve is complete and the outcome video 1012 occupies the entire display area 1008.

Figure 11:
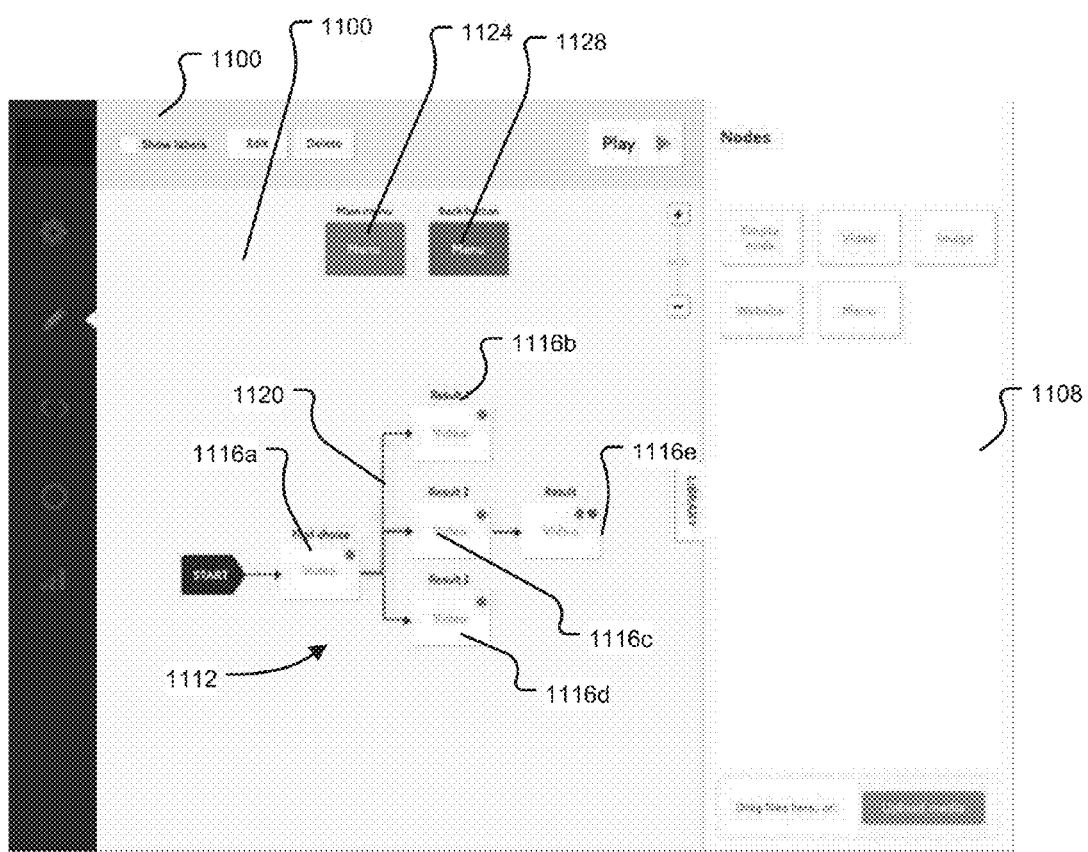
FIG. 11 is a screen shot of an additional example graphical user interface that may be provided by the editor module shown in FIG. 1.

FIG. 11 is a screen shot of an additional example graphical user interface 1100 that may be provided by the editor module 160. Like the graphical user interface 800 of FIG. 8, the graphical user interface 1100 generally includes a workspace 1104 and a media area 1108. The workspace 1104 may include an interactive project structure or branching sequence map 1112. The map 1112 may include a number of nodes 1116a-e that are interconnected through the various node connectors 1120. The nodes 1116a-e represents particular segments in an interactive video or in a prospective interactive video. The graphical user interface 1100 additionally includes menu editor buttons 1124, 1128 that may be selected to edit menu features of the interactive video or prospective video.

Figure 12:
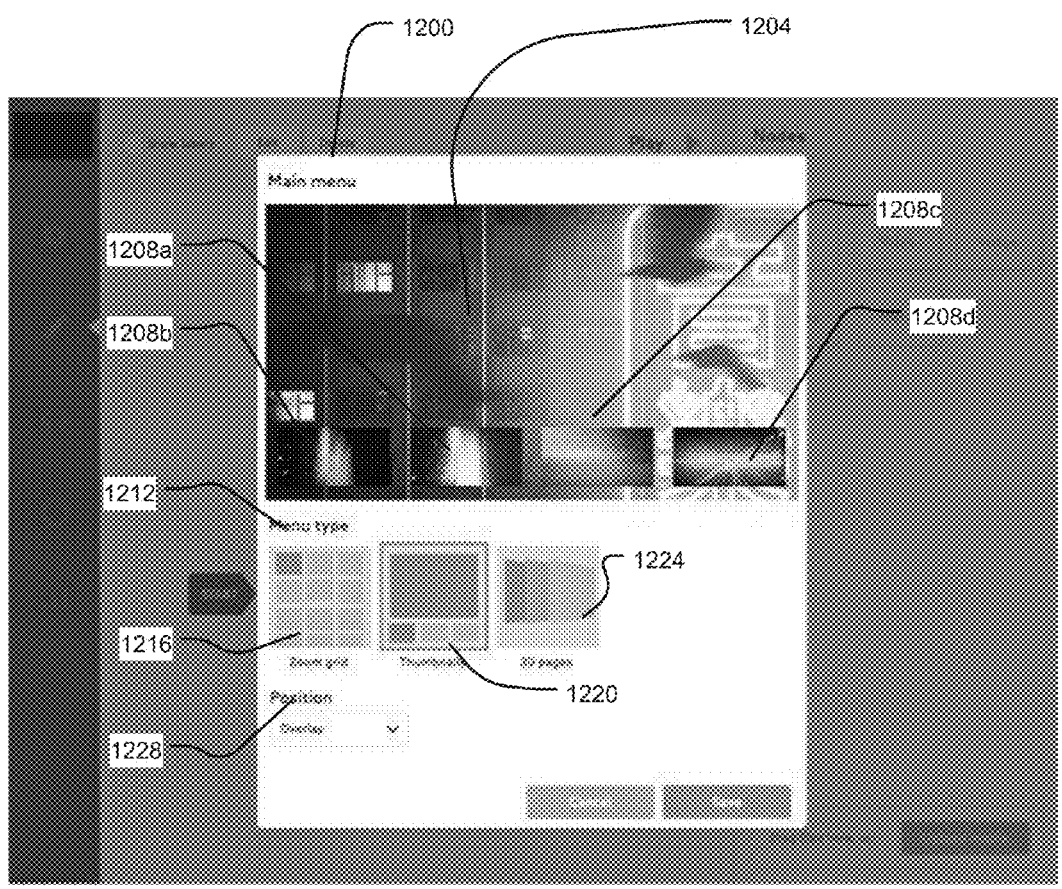
FIG. 12 is a screen shot of an example menu editor that may activated by selecting the main menu editor button shown in FIG. 11.

FIG. 12 is a screen shot of an example menu editor 1200 that may activated by selecting the main menu editor 1124 shown in FIG. 11. The menu editor 1200 may be used to select a particular background 1204 that may be displayed during a transition between various interactive video segments 1208a-d. The menu editor 1200 also includes menu type selector 1212 that may be used to select different arrangements for the video segments 1208a-d when they appear over the background 1204. For example, menu type selector 1212 may be used to select arrangements such as "Zoom Grid" 1216, "Thumbnail" 1220, "3D Pages" 1224, and the like. As can be seen in FIG. 12, the "Thumbnail" 1220 menu type is selected. The menu editor 1200 may additionally include a position selector 1228 that may be used to select positions for the video segments 1208a-d when they appear over the background 1204.

FIG. 13 illustrates a simplified code listing 1300 for an example video implementation in accordance with the present disclosure. The listing 1300 provides a general outline of code that implements dynamic video effects such as improved branch selections and video transition features described herein. The listing 1300 includes Web Graphics Library ("WebGL") code by way of example and not limitation. Generally, the code set forth in FIG. 13 operates to render a video in or as a portion of a three dimensional (3D) graphical environment. The video may be received and processed by a web browser as a payload in two-dimensional (2D) form. Executing the code of the present disclosure, the browser may receive the 2D video payload and provide a final video output that includes the 2D video rendered in a 3D graphical environment. Rendering of the final video output may occur on a frame-by-frame basis. In this way, the rendering of the final video output may change or otherwise be responsive to user inputs that may occur as the video is playing. For example, a user may select a video hot spot and a distortion or indication may appear in the video rendering to indicate the hot spot selection. Where the video rendering includes a transition between branching video segments, one or more videos may be rendered as different elements or within different areas of the final video output. Referring to FIG. 13, the listing 1300 includes a first code segment 1304 where an example video is setup through an application programming interface. The example video may be any of the various branching videos or branching video segments described herein. In a second code segment 1308, a WebGL texture is attached to an HTML5 video iframe. In a third code segment 1312, the video is applied as a two dimensional texture in a WebGL surface for every frame of the video. A fourth code segment 1316 represents a function that that may be called each frame by a browser executing the video.

As mentioned in connection with FIG. 5, embodiments of the present disclosure are directed to an interactive video that is responsive to user input provided through a selector object. Generally, the selector object may be a video or a graphical representation of an object. In some embodiments, the selector object is a graphical rendering of a three-dimensional object. The following description references a three-dimensional selector object that is a rendering a three-dimensional object by way of example and not limitation. In a given orientation, the three-dimensional selector object may be rendered with one or more surfaces visible to the user and one or more surfaces hidden from the user's view. One or more selector mechanisms may be arranged on one or more surfaces of the three-dimensional selector object. Depending on the orientation of the three-dimensional selector object, some selector mechanisms may be visible to the user, while others are not. If the three-dimensional selector object is oriented such that a particular surface and a particular selector mechanism arranged on the surface are visible to the user, then that selector mechanism may be selectable by the user. If the three-dimensional selector object is oriented such that the surface and the selector mechanism arranged on the surface are not visible to the user, then that selector mechanism may not be selectable by the user without reorienting the three-dimensional selector object.

The three-dimensional selector object may be oriented via user input. For example, the user may hover a mouse cursor or other point device over the three-dimensional selector object to engage the object. Once the three-dimensional selector object is engaged, directional movements of the mouse or other pointing device may cause a corresponding movement of the three-dimensional selector object. In one example, a directional movement of the mouse may cause the three-dimensional selector object to rotate in a corresponding direction. By providing user input to move the three-dimensional selector object into various orientations, the user may access the various selector mechanisms that are arranged on the various surfaces of the three-dimensional selector object. For example, if a particular selector mechanism is hidden from view, the user may provide inputs that move the three-dimensional selector object into a position where the selector mechanism is visible. The selector mechanism may then be selected through further user input such as a mouse click.

A three-dimensional selector object may generally be used to enable or engage an interactive video in accordance with the present disclosure. The interactive video may include one or more interactive video segments. In some embodiments where the interactive video includes a plurality of interactive video segments, the segments may be arranged in a sequence such that some videos follow others in a prearranged order. In other embodiments where the interactive video includes a plurality of video segments, the segments may be arranged in no particular order. In some embodiments, the interactive video may include one interactive video segment. A user may engage or enable the interactive video via the various selector mechanism that are arranged on the various surfaces of the three-dimensional selector object. For example, the three-dimensional selector object may include a first selector mechanism that may be selected to play a first interactive video segment, a second selector mechanism that may be selected to play a second interactive video segment, and so on.

The selector mechanisms arranged on the various surfaces of a three-dimensional selector object may take different forms in accordance with various embodiments. In one embodiment, a selector mechanism may be a button or other icon that is overlain on or otherwise associated a surface of the three-dimensional selector object. In other embodiments, a selector may incorporate more complex or dynamic video effects. For example, a selector mechanism may be an object or a surface that is itself part of the three-dimensional selector object. Here, the user may interact directly with an object, surface, or "hot spot" on the three-dimensional selector object to bring about a response from the interactive video, such as a transition to a subsequent interactive video segment. The three-dimensional selector object may employ various techniques that indicate to a user which of the various objects, surfaces, or hot spots in the interactive video are "selector mechanisms" with which the user may interact. For example, some implementations may distort, darken, blur, or otherwise highlight the selector mechanism or the area around the selector mechanism to invite the user to interact with the selector mechanism. Additional complex or dynamic video effects may also be used to indicate that the user's interaction with the selector mechanism has been registered with the system. For example, once the user interacts with the selector mechanism, one or more aspects of the video may change such as, objects or surfaces may distort, the entire video area may distort, and so on.

A selector object or a selector mechanism associated with a selector object may be used to reflect activities that occur in an associated interactive video. In one implementation, progress of an interactive video or interactive video segment may be reflected in an associated selector object or selector mechanism. For example, an interactive video segment may be associated with a selector mechanism that is rendered as a line or linear path on a surface of a selector object. Here, the selector mechanism may include a point or other object that moves along the line in coordination with the playing of the interactive video segment. As the interactive video segment progress from start to finish, the point or other object may move along the line from a starting point to an ending point. In this way, the progress of the interactive video segment is tracked or reflected by a visual indication in the selector object associated with the interactive video. The progress tracking implementation is described by way of example and not limitation. In other implementations, other activities that occur in the interactive video may be tracked or reflected through a visual change or indication in the associated selector object.

Figure 14:
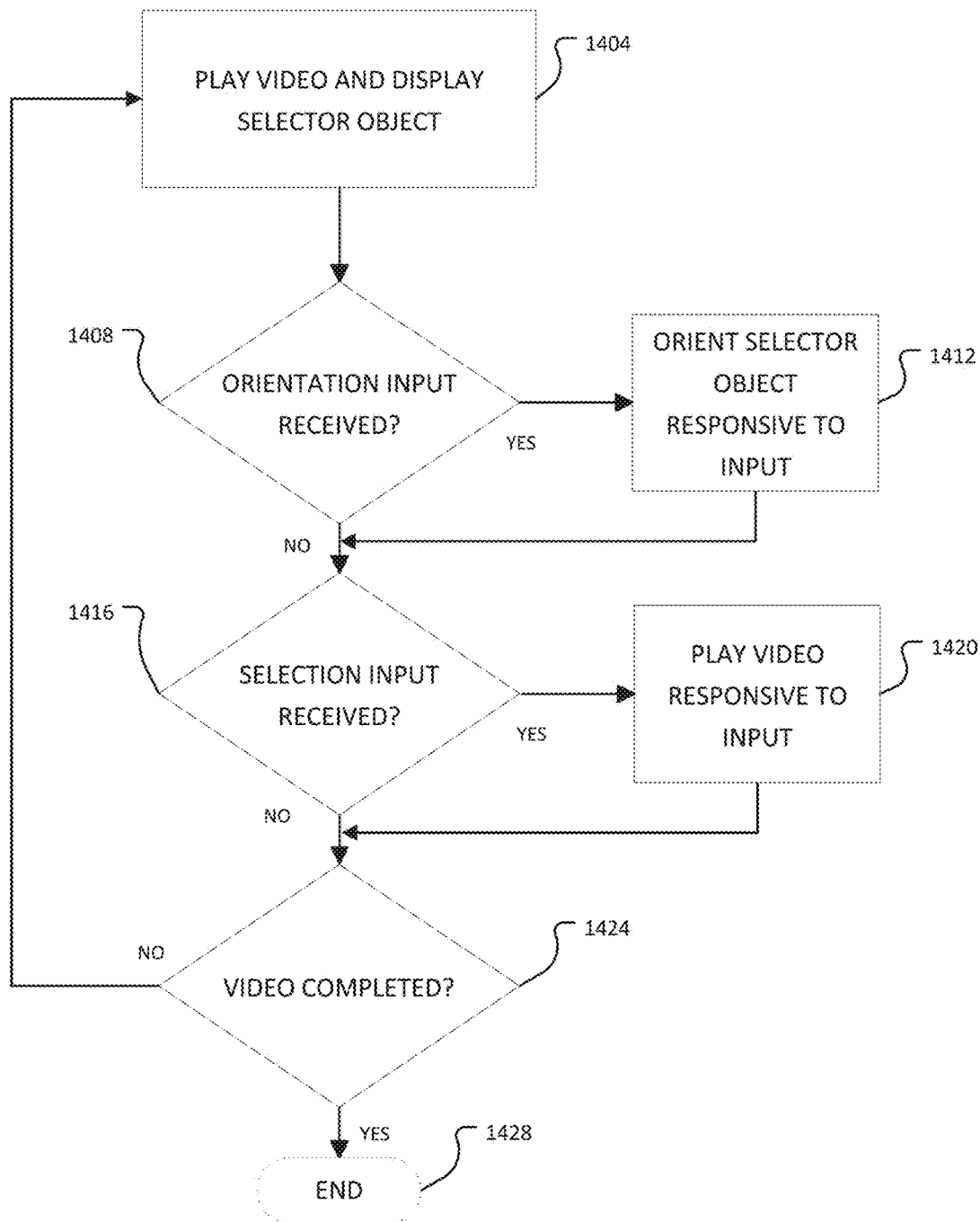
FIG. 14 is a flow chart that illustrates various operations executed by a player module that function to play or otherwise enable an interactive video or interactive video segment responsive to input received through a selector object in accordance with embodiments discussed herein.
Figure 15:
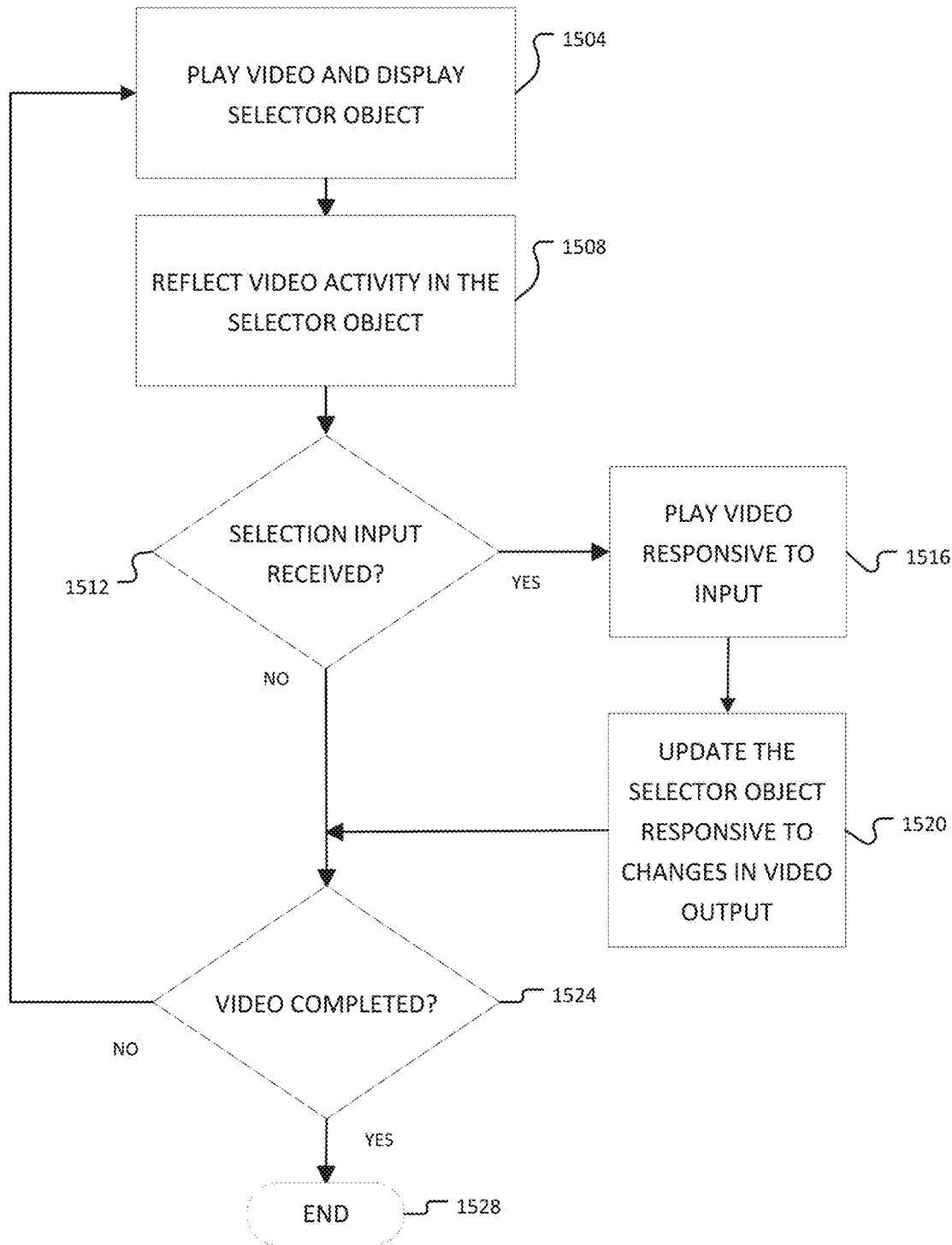
FIG. 15 is a flow chart that illustrates various operations executed by a player module that function to reflect or otherwise indicate interactive video activities in a selector object or selector mechanism associated with the selector object in accordance with embodiments discussed herein.

A three-dimensional selector object in accordance with the present disclosure may be implemented in the context of the computing environment of shown in FIG. 1. More specifically, a player module 104 executing on a computing device 108 may be configured to provide a run-time environment for an interactive video that is provided in association with a three-dimensional selector object. FIGS. 14 and 15 are flow charts that illustrate various operations executed by a player module 104 in accordance with further embodiments of the present disclosure. Generally, FIG. 14 illustrates operations of the player module 104 that function to play or otherwise enable an interactive video or interactive video segment responsive to input received through a selector object in accordance with embodiments discussed herein. FIG. 15 illustrates operations of the player module that function to reflect or otherwise indicate interactive video activities in a selector object or selector mechanism associated with the selector object.

FIGS. 14 and 15 include operations of a player module 104 that include displaying an interactive video. As described in greater detail in connection with FIG. 2, the player module 104 may play an interactive video in response to a user selection such as by the user clicking on a displayed link, downloading a file, selecting an icon, and so on. In some embodiments, the user selection of the interactive video may occur inside a browser running on a user computing device 108. Here, the user may select a link in a webpage or other document that is accessible by the browser. The link may direct the browser to an interactive video 136 that resides on a server 140 or other remote computing device. Following this direction, the browser may download at least one video segment 148 of the interactive video 136. In some embodiments, the browser may avoid unnecessary network transactions by downloading interactive video segment as needed responsive to user interactions with particular selectors. Further, the player module 104 may access a graphics card 124 associated with the computing device 108, by-passing the browser's rendering engine. Through its direct access to the graphics card 124, the player module 104 may display a three-dimensional selector object having one or more selector mechanisms displayed thereon.

Referring to FIG. 14, in operation 1404, the player module 104 may play an interactive video and display a selector object. The interactive video may have one or more interactive video segments that may be organized in a sequence or that may be independent of each other. The selector object may be displayed in association with the interactive video. For example, the selector object may be displayed adjacent to the interactive video in a lateral, horizontal, vertical direction or a combination of these directions. Here, the selector object and the video interactive are both displayed in the same display area that is available for video output on a video screen associated with a computing device. In some implementations, the selector object and the interactive video may partially or completely overlap. With the interactive video and selector object displayed, the player module 104 is enabled to receive input via the selector object.

In operation 1408, the player module 104 may determine if orientation input has been received. Orientation input may be received through a mouse or other pointing device that a user operates to interact with or otherwise engage the displayed selector object. The orientation input may be in the form of a directional input that specifies a corresponding movement of the selector object. For example, the orientation input may specify a rotation of the selector object about one or more axes of rotation. In an implementation where the selector object is a graphical rendering of a three dimensional object, rotation of the three dimensional object may result in one or more surfaces that were previously not visible moving into a visible position. In some implementation, the orientation input may specify a translational movement where the selector object moves from one location to another within the video display area. Operation 1412 may be executed following operation 1408 if orientation input has been received. In operation 1412, the player module 104 may orient the selector object responsive to the input received in operation 1408.

Operation 1416 may be executed following operation 1408 if orientation input has not been received. Additionally, operation 1416 may be executed following operation 1412. In operation 1416, the player module 104 may determine if selection input has been received. Selection input may be received through a mouse or other pointing device that a user operates to interact with or otherwise engage a selector mechanism displayed on or in association with the displayed selector object. Here, the selector object may include one or more selector mechanism such as icons, buttons, hot spots or the like. Each selector mechanism may correspond to a particular action associated with the interactive video displayed in association with the selector object. For example, one or more selector mechanisms may correspond to a particular segment of the interactive video. Here, the selection input may select a particular video segment for display by specifying a particular selector mechanism associated with the selector object. Operation 1420 may be executed following operation 1416 if selection input has been received. In operation 1420, the player module 104 may play video responsive to the input received in operation 1416.

Operation 1424 may be executed following operation 1416 if selection input has not been received. Additionally, operation 1424 may be executed following operation 1420. In operation 1424, the player module 104 may determine if the video has completed. If so, the method may end in operation 1428. If not, operation 1404 may again be executed such that the video continues to play and input continues to be received via the selector object.

Referring to FIG. 15, in operation 1504, the player module 104 plays the video and displays a selector object. The interactive video may have one or more interactive video segments that may be organized in a sequence or that may be independent of each other. The selector object may be displayed in association with the interactive video. For example, the selector object may be displayed adjacent to the interactive video in a lateral, horizontal, vertical direction or a combination of these directions. Here, the selector object and the video interactive are both displayed in the same display area that is available for video output on a video screen associated with a computing device. In some implementations, the selector object and the interactive video may partially or completely overlap. With the interactive video and selector object displayed, the player module 104 is enabled to receive input via the selector object.

In operation 1508, the player module 104 renders the selector object or a selector mechanism associated with the selector object so as to reflect activities that occur in the associated interactive video. In one implementation, the selector object or selector mechanism is displayed so as to track progress of the video on a surface of the selector object. As described above, such progress tracking may occur via movement of a point or other object along a selector mechanism that is rendered as a line or linear path in or on the selector object. Other visual representation of interactive video activity in the selector object may be implemented in accordance with the present disclosure.

In operation 1512, the player module 104 determines if selection input has been received. Selection input may be received through a mouse or other pointing device that a user operates to interact with or otherwise engage a selector mechanism displayed on or in association with the displayed selector object. Here, the selector object may include one or more selector mechanism such as icons, buttons, hot spots or the like. Each selector mechanism may correspond to a particular action associated with the interactive video displayed in association with the selector object. For example, one or more selector mechanisms may correspond to a particular segment of the interactive video. Here, the selection input may select a particular video segment for display by specifying a particular selector mechanism associated with the selector object. Operation 1516 may be executed following operation 1512 if selection input has been received. In operation 1516, the player module 104 plays video responsive to the input received in operation 1512.

Operation 1520 may be executed following operation 1516. In operation 1520, the player module 104 updates the rendering of the selector object so as to reflect changes in the display of the interactive video that occur as a result of the changes to the video that occurred in operation 1516. Continuing with the above example, the player module 104 may reposition the progress tracking output provided via the selector object or selector mechanism associated with the selector output. If progress tracking occurs via movement of a point or other object along a line or linear path, the player module 104 may reposition the point or other object such that its location corresponds to the current progress of the interactive video or interactive video segment. If the interactive video or interactive video segment is now playing from a beginning, the point or other object may be repositioned to a beginning point on a selector mechanism rendered as a line or linear path. If the received selection input selects a different interactive video segment than the one previously playing, then the player module may reposition the progress tracking point or object to a selector mechanism corresponding to the new selection.

Operation 1524 may be executed following operation 1512 if selection input has not been received. Additionally, operation 1524 may be executed following operation 1520. In operation 1524, the player module 104 may determine if the video has completed. If so, the method may end in operation 1528. If not, operation 1504 may again be executed such that the video continues to play and input continues to be received via the selector object.

Figure 16A:
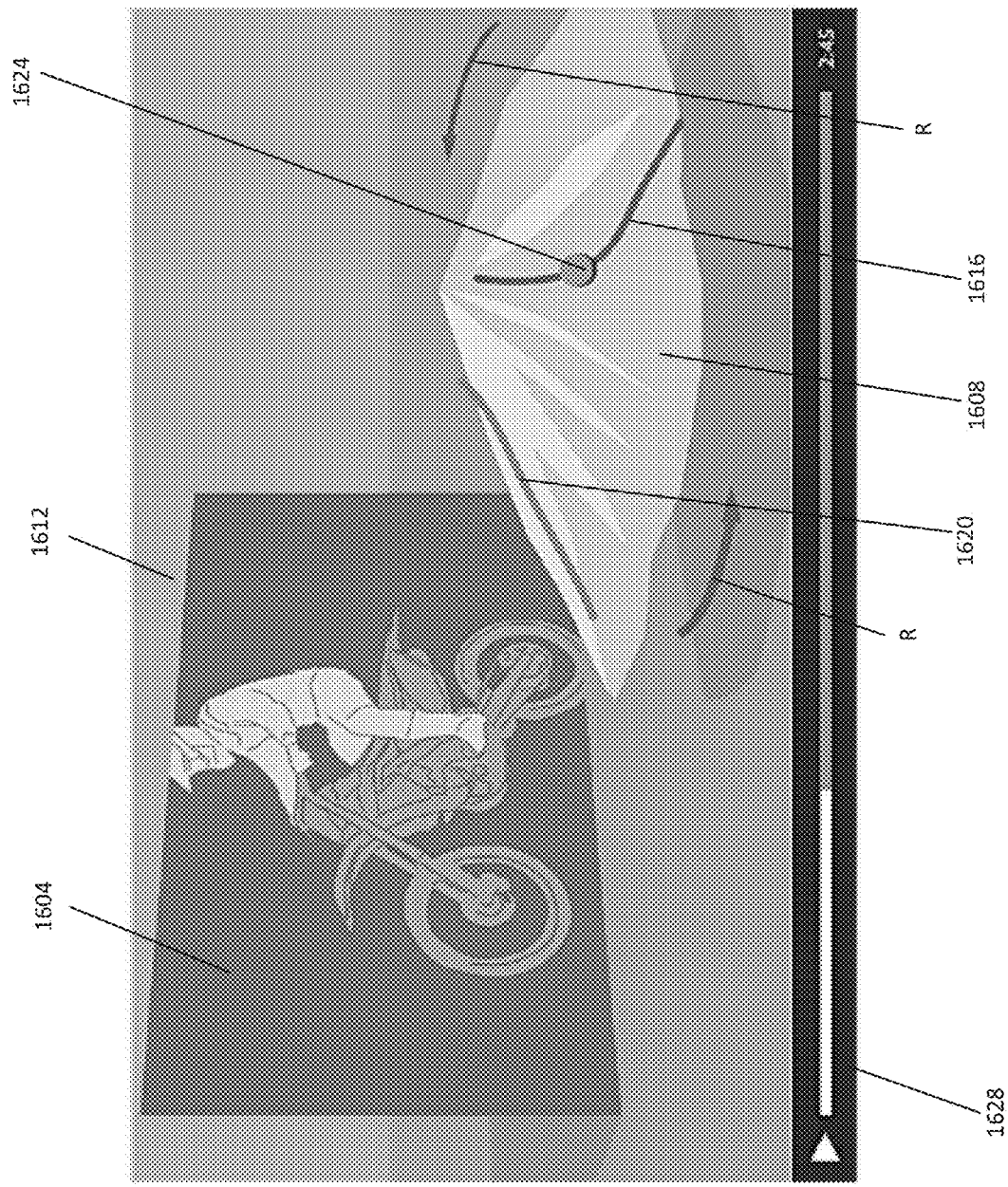
FIGS. 16A-C illustrate an example interactive video that is provided in association with a selector object in accordance with the present disclosure.
Figure 16B:
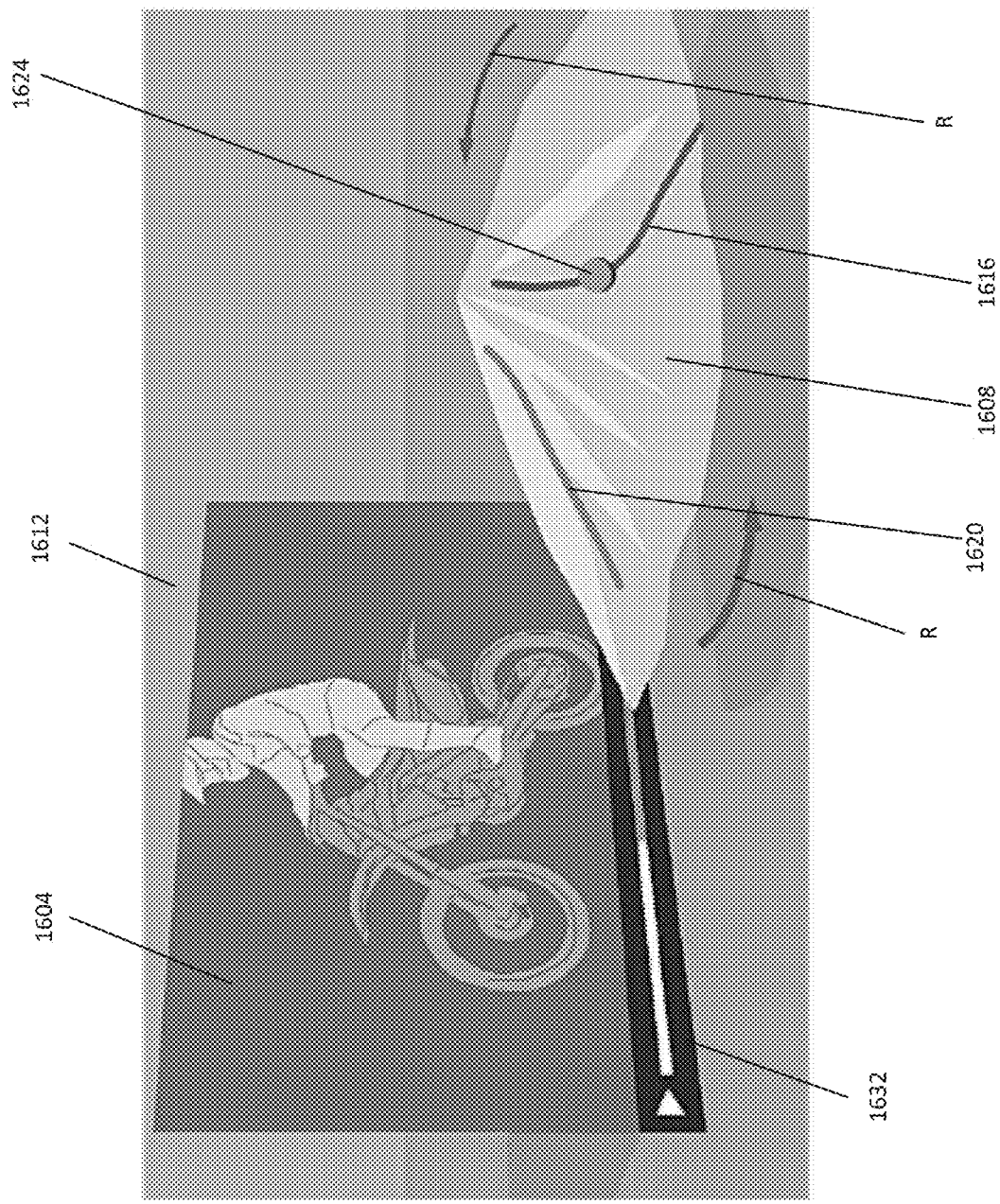
Figure 16C:
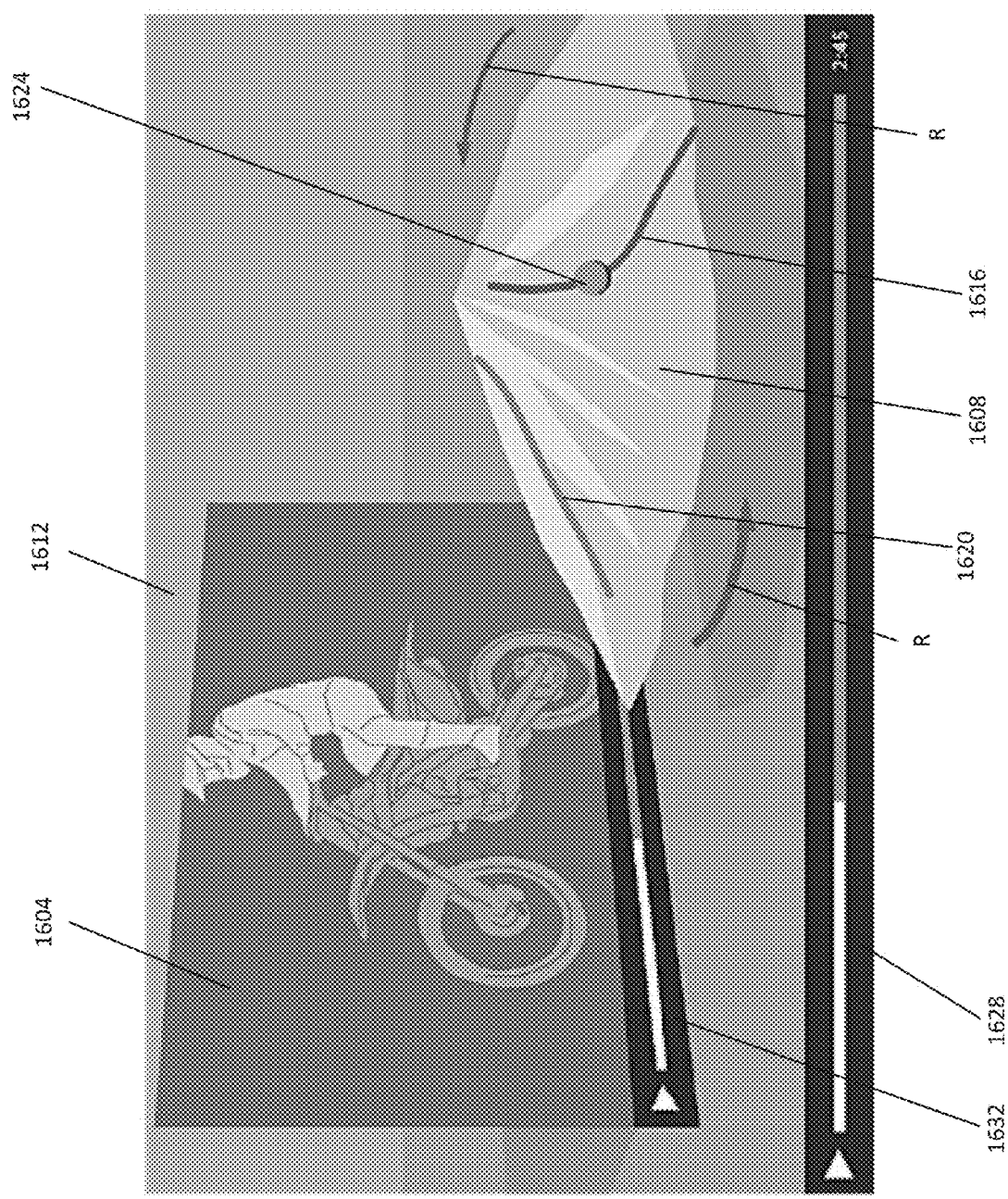

FIGS. 16A-C illustrate an example interactive video 1604 that is provided in association with a three-dimensional selector object 1608 in accordance with the present disclosure. Both the interactive video 1604 and three-dimensional selector object 1608 operate within a common video display area 1612. The illustrated three-dimensional selector object 1608 is a graphical rendering of a mountain. In the orientation of three-dimensional selector object 1608 shown in FIGS. 16A-C, some sides of the mountain are visible to the user, while some sides of the mountain are not. As mentioned, a three-dimensional selector object in accordance with the present disclosure may be oriented via user input such as provided through a mouse or other pointing device. Thus, as indicated by the arrows R in FIGS. 16A-C, the three-dimensional selector object 1608 may be rotated such that the various sides of the mountain may be brought into the user's field of view. As further shown in FIGS. 16A-C, the three-dimensional selector object 1608 may include at least two selector mechanisms 1616, 1620 in the form paths down the mountain. The selector mechanisms 1616, 1620 may be rotated in and out of the user's view as the three-dimensional selector object 1608 is rotated via user input. When a particular selector mechanisms 1616, 1620 is in the user's view, that selector mechanisms 1616, 1620 may be actuated via further user input to enable or engage the interactive video 1604 or a particular segment of the interactive video 1604.

As mentioned, an interactive video in accordance with the present disclosure may have one or more interactive video segments that may be organized in a sequence or that may be independent of each other. The interactive video 1604 illustrated FIGS. 16A-C includes at least one interactive video segment that is shown playing adjacent to the three-dimensional selector object 1608. By way of example, the currently playing segment of the interactive video segment 1604 may be enabled via a first selector mechanism 1616 associated with the three-dimensional selector object 1608. Thus, in order to play the interactive video segment 1604, a user may provide input that orients the three-dimensional selector object 1608 such that the first selector mechanism 1616 is visible (if it is not already so oriented). The user may then provide additional user input that selects the first selector mechanism 1616. The interactive video segment 1604 may then play responsive to this further input. The user may provide additional user inputs in a similar fashion to enable a second interactive video segment via the second selector mechanism 1620.

A three-dimensional selector object in accordance with the present disclosure may have a thematic relationship to the interactive video with which it is associated. By way of example, FIGS. 16A-C include an interactive video 1604 of mountain biking and a three-dimensional selector object 1608 in the form of graphical rendering of a mountain. The interactive video 1604 and the three-dimensional selector object 1608 may therefore be tied together both functionally and thematically. As mentioned, the three-dimensional selector object 1608 may include selector mechanisms 1616, 1620 in the form of paths down the mountain. In this regard, the particular interactive video segments enabled via the selector mechanisms 1616, 1620 may be videos of a cyclist or cyclists riding down a mountain on paths that are represented by the selector mechanisms 1616, 1620. The mountain or mountain biking theme of FIGS. 16A-C is provided by way of example and not limitation. Other themes that relate an interactive video to a three-dimensional selector object may be implemented in accordance with this disclosure.

FIGS. 16A-C additionally illustrate a selector mechanism that is used to reflect activities that occur in an associated interactive video. In FIGS. 16A-C, progress of the interactive video segment 1604 is reflected in the selector mechanism 1616 that is used to select the interactive video segment 1608. By way of example, the interactive video segment 1604 is associated with a selector mechanism 1616 that is rendered as a line or linear path on a surface of a selector object 1608. The selector object 1608 is a graphical rendering of a mountain and so the line or linear path represents a path down the mountain. In order to track the progress of the interactive video segment 1608, the selector mechanism 1616 may include a point or other object 1624 that moves along the line in coordination with the playing of the interactive video segment 1604. As the interactive video segment 1604 progress from start to finish, the point or other object 1624 may move along the line from a starting point to an ending point. In this way, the progress of the interactive video segment 1604 is tracked or reflected by a visual indication in the selector object 1608 associated with the interactive video. More specifically, the progress of the interactive video segment 1604 is tracked or reflected by a visual indication in the selector mechanism 1616 that is used to select the interactive video segment 1604 for playing. In some cases, the progress tracking implemented through the selector mechanism 1616 may be correspond to the content of the interactive video segment. In the current example, the video may be of a cyclist descending a mountain along a path as represented through the movement of the object 1624 along the selector mechanism. The progress tracking implementation is described by way of example and not limitation. In other implementations, other activities that occur in the interactive video may be tracked or reflected through a visual change or indication in the associated selector object.

An interactive video segment 1604 and associated selector object 1608 may be displayed along with one or more control panels. FIGS. 16A-C show various example control panel implementations. As shown in FIG. 16A, a control panel 1628 may be displayed along the bottom edge of the display area 1612. As shown in FIG. 16B, a control panel 1632 may displayed along the bottom edge of the display area used for the interactive video content segment 1604. FIG. 16C illustrates an embodiment where two control panels are used. A first control panel 1628 may be displayed along the bottom edge of the display area 1612. A second control panel 1632 may displayed along the bottom edge of the display area used for the interactive video content segment 1604. In accordance with various embodiments, the control panels 1628, 1632 may include a progress bar, a play icon, a timer, and so on.

The technology described herein may be implemented as logical operations and/or modules in one or more systems. The logical operations may be implemented as a sequence of processor implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the invention. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The foregoing description has broad application. The discussion of any embodiment is meant only to be explanatory and is not intended to suggest that the scope of the disclosure, including the claims, is limited to these examples. In other words, while illustrative embodiments of the disclosure have been described in detail herein, the inventive concepts may be otherwise variously embodied and employed, and the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The invention claimed is:

1. A method of displaying an interactive video, comprising:
    rendering and playing a base video segment having at least one selector for an outcome video segment;
    receiving input selecting the at least one selector;
    transitioning to the outcome video segment while playing both the base video segment and the outcome video segment on particular portions of a display area, wherein the base video segment and the outcome video segment complement one another so as to form an integrated storyline for the interactive video.

2. The method of claim 1, further comprising:
    rendering and playing both the base video segment and the outcome video segment after the transitioning is complete.

3. The method of claim 1, further comprising:
    rendering and playing the outcome video segment and not the base video segment after the transitioning is complete, such that the outcome video segment forms a next plot structure in the integrated storyline.

4. The method of claim 1, wherein transitioning to the outcome video segment includes playing the base video segment and the outcome video segment on the opposing side of a three dimensional object that flips during the transition.

5. The method of claim 1, wherein transitioning to the outcome video segment includes fading video windows into and out of a foreground during the transition.

6. The method of claim 1, wherein transitioning to the outcome video segment includes cross dissolving the base and the outcome video segments.

7. The method of claim 1, wherein the selector is an object in the base video segment and selection of the selector leads to the output video segment corresponding to a branch in a plot of the interactive video.

8. The method of claim 1, wherein the selector is a surface of an object in the base video and selection of the selector leads to the output video segment corresponding to a branch in a plot of the interactive video.

9. The method of claim 1, further comprising applying a video effect to the base video segment to indicate a location of a selector in the base video segment.

10. The method of claim 9, wherein applying a video effect includes distorting a surface of the base video segment.

11. The method of claim 9, wherein applying a video effect includes adding a color to a portion of the base video segment that includes the selector.

12. A system for displaying an interactive video, comprising:
    at least one processor; and
    at least one memory operably linked to the at least one processor, wherein the at least one memory comprises instructions, which when executed on the at least one processor, cause the processor to:
    render and play a base video having at least one selector for an outcome video;
    receive input selecting the at least one selector;
    transition to the outcome video while rendering and playing both the base video and the outcome video on particular portions of a display area, wherein the outcome video and the base video each form interconnected plot segments of the interactive video.

13. A method of displaying an interactive video, comprising:
    displaying a selector object associated with an interactive video;
    receiving user input indicating a user interaction with at least one surface of the selector object, wherein the selector object is a graphical rendering of a three-dimensional object and a selector mechanism is rendered on at least one surface of the three-dimensional object such that user interaction with the at least one surface includes a user interaction with the selector mechanism;
    receiving user input that specifies a movement of the selector object;
    rendering the selector object including effecting a movement of the selector object responsive to the user input, wherein movement of the selector object brings the selector mechanism into a location where the selector mechanism is capable of being engaged by a user; and
    rendering and playing a video segment responsive to the user interaction with the at least one surface of the selector object.

14. The method of claim 13, wherein:
    the selector three-dimensional object is an object in a base video of the interactive video; and
    rendering and playing a video segment responsive to the user interaction includes transitioning to an outcome video while playing both the base video and the outcome video on particular portions of a display area.

15. The method of claim 13, wherein the selector object and the interactive video are displayed together in a display area with the selector object being adjacent to the interactive video.

16. The method of claim 13, wherein the selector mechanism is a first selector mechanism and the selector object further comprises a second selector mechanism rendered on at least one surface of the three-dimensional object, the method further comprising
    rendering a first interactive video segment responsive to a user selection of the first selector mechanism; and
    rendering a second interactive video segment responsive to a user selection of the second selector mechanism.

17. The method of claim 13, further comprising:
rendering the selector mechanism to reflect activity in the interactive video segment.

18. The method of claim 17, further comprising:
rendering the selector mechanism as a linear path along the selector object;
wherein rendering the selector mechanism to reflect activity in the interactive video segment includes moving an object along the linear path.

19. A system for displaying an interactive video, the system comprising:
- a processing element in electrical communication with a server via a network, the server hosting a plurality of video segments corresponding to an interactive video;
- a graphics card in communication with the processing element; and
- a memory storage component containing instructions that when executed by the processor cause the processor to perform the following operations:

receive a user selection selecting the interactive video by selection of a link accessible by a web browser, wherein the web browser includes a browser rendering engine;

render and play a first video segment hosted on the server, the first video segment corresponding to the interactive video; wherein the first video segment includes a selector corresponding to a second video segment; and the render and play operation comprises directly accessing the graphics card and bypassing the browser rendering engine;

receive a user interaction of the selector; and render and play the second video based on the user interaction of the selector.

* * * * *